(12) United States Patent
Vanaverbeke et al.

(10) Patent No.: US 12,483,196 B2
(45) Date of Patent: Nov. 25, 2025

(54) MULTIPLE-MODE RF POWER AMPLIFIERS

(71) Applicant: NXP USA, Inc., Austin, TX (US)

(72) Inventors: Frederik Vanaverbeke, Gilbert, AZ (US); Roy McLaren, Gilbert, AZ (US)

(73) Assignee: NXP USA, INC., Austin, TX (US)

( * ) Notice: Subject to any disclaimer, the term of this patent is extended or adjusted under 35 U.S.C. 154(b) by 486 days.

(21) Appl. No.: 18/146,502

(22) Filed: Dec. 27, 2022

(65) Prior Publication Data
US 2024/0213926 A1 Jun. 27, 2024

(51) Int. Cl.
*H03F 1/02* (2006.01)
*H03F 1/56* (2006.01)
*H03F 3/21* (2006.01)

(52) U.S. Cl.
CPC ............ *H03F 1/0288* (2013.01); *H03F 1/56* (2013.01); *H03F 3/211* (2013.01); *H03F 2200/387* (2013.01); *H03F 2200/451* (2013.01); *H03F 2203/21131* (2013.01); *H03F 2203/21139* (2013.01)

(58) Field of Classification Search
CPC .......... H03F 1/0288; H03F 1/56; H03F 3/211; H03F 2200/387; H03F 2200/451; H03F 2203/21131; H03F 2203/21139
USPC ...................................................... 330/296
See application file for complete search history.

(56) References Cited

U.S. PATENT DOCUMENTS

| | | |
|---|---|---|
| 6,922,102 B2 | 7/2005 | Myer et al. |
| 9,837,966 B1 | 12/2017 | Ahmed et al. |
| 2004/0189381 A1 | 9/2004 | Louis |
| 2007/0126502 A1 | 6/2007 | Louis |

(Continued)

FOREIGN PATENT DOCUMENTS

| | | | | |
|---|---|---|---|---|
| CN | 101350599 B | * | 11/2010 | ............... H03F 3/72 |
| CN | 107294499 A | * | 10/2017 | ........... H03F 1/0288 |
| GB | 2579906 B | | 6/2021 | |

OTHER PUBLICATIONS

Quaglia, Roberto et al; "A Load Modulated Balanced Amplifier for Telecom Applications"; IEEE Transactions on Microwave Theory and Techniques, vol. 66, No. 3; 11 pages (Mar. 2018).

(Continued)

*Primary Examiner* — Hafizur Rahman
(74) *Attorney, Agent, or Firm* — Sherry W. Gourlay

(57) ABSTRACT

A multiple-mode RF power amplifier includes two power amplifiers, output combiner circuitry, and a switchable impedance circuit. The power amplifiers receive first and second input RF signals and produce first and second amplified RF signals. The output combiner circuitry combines the amplified RF signals to produce a combined amplified RF signal. The switchable impedance circuit has an input terminal coupled to an isolated port of the output combiner circuitry. When the switchable impedance circuit is in a first state, the isolated port is coupled through the switchable impedance circuit to a first impedance to configure the multiple-mode RF power amplifier as a balanced amplifier. When the switchable impedance circuit is in a second or third state, the isolated port is coupled through the switchable impedance circuit to a second or third impedance to configure the multiple-mode RF power amplifier as a first or second type of Doherty power amplifier.

15 Claims, 12 Drawing Sheets

(56) References Cited

U.S. PATENT DOCUMENTS

| | | | | |
|---|---|---|---|---|
| 2013/0314162 A1* | 11/2013 | Schmidt | ............... | H03F 1/0288 |
| | | | | 330/295 |
| 2020/0382071 A1* | 12/2020 | Chen | ...................... | H03F 1/565 |
| 2023/0280395 A1* | 9/2023 | Munzer | ................. | H01Q 3/267 |
| | | | | 324/750.3 |
| 2024/0213925 A1* | 6/2024 | Presti | ..................... | H03F 3/245 |
| 2025/0180636 A1* | 6/2025 | Munzer | .............. | G01R 31/2837 |

OTHER PUBLICATIONS

Quaglia, Roberto et al; "Analysis and Characterization of a Load Modulated Balanced Amplifier for Base-Station Applications"; IMA e.v., Ratingen, Germany; 4 pages (Mar. 2018).

Lyu, H. et al; "Balanced-to Doherty Mode Reconfigurable Power Amplifier with High Efficiency and Linearity Against Load Mismatch"; IEEE Trans. on Microwave Theory and Techniques, vol. 68, No. 5; pp. 1717-1728 (May 2020).

Mannem, N. S. et al.; "A Reconfigurable Hybrid Series/Parallel Doherty Power Amplifier with Antenna VSWR Resilient Performance for MIMO Arrays"; IEEE J. of Solid-State Circuits, vol. 55, No. 12; pp. 3335-3348 (Dec. 2020).

\* cited by examiner

| Combiner type | Balanced Amplifier | | | | Parallel Doherty Power Amplifier | | | | Series Doherty Power Amplifier | | | |
|---|---|---|---|---|---|---|---|---|---|---|---|---|
| | Circuit 150 state | Amp 126 | Amp 128 | RL case | Circuit 150 state | Amp 126 | Amp 128 | RL case | Circuit 150 state | Amp 126 | Amp 128 | RL case |
| 90 degree hybrid coupler 300 | SYSTEM TERMINATING IMPEDANCE Z0 | CLASS AB VDS nominal | CLASS AB VDS nominal | HARSH | OPEN | CLASS AB VDS scale up | CLASS C VDS scale down | RL decreased | SHORT | CLASS C VDS scale down | CLASS AB VDS scale up | RL increased |
| coupled line coupler 400 | SYSTEM TERMINATING IMPEDANCE Z0 | CLASS AB VDS nominal | CLASS AB VDS nominal | HARSH | OPEN | CLASS AB VDS scale up | CLASS C VDS scale down | RL decreased | SHORT | CLASS C VDS scale down | CLASS AB VDS scale up | RL increased |
| branch line coupler 500 | SYSTEM TERMINATING IMPEDANCE Z0 | CLASS AB VDS nominal | CLASS AB VDS nominal | HARSH | SHORT | CLASS AB VDS scale up | CLASS C VDS scale down | RL increased | OPEN | CLASS C VDS scale down | CLASS AB VDS scale up | RL decreased |

FIG. 7

MULTIPLE-MODE RF POWER AMPLIFIERS

TECHNICAL FIELD

Embodiments of the subject matter described herein relate generally to radio frequency (RF) power amplifiers that can be reconfigured to operate as various types of amplifiers, and methods of operating such reconfigurable RF power amplifiers.

BACKGROUND

Wireless communication systems employ power amplifiers for increasing the power of radio frequency (RF) signals. In a cellular base station, for example, a conventional RF front end (RFFE) system includes an RF signal transmission chain with one or more RF amplifier stages. The final RF amplifier stage in such a chain provides amplified RF signals to an antenna for radiation over the air interface. High gain, high linearity, stability, and a high level of power-added efficiency are characteristics of a desirable power amplifier in an RFFE system.

A robust RFFE system should be designed to perform well even in a harsh radio environment (e.g., an environment in which relatively severe interfering signals from the antenna may be communicated to the output of the final stage RF amplifier). When left unaddressed, such "reverse interference" may, for example, result in significant load mismatch and the generation of reverse inter-modulation distortion (IMD) products in the RF power amplifier.

To mitigate the effects of potentially severe reverse interference, some conventional RFFE systems include a circulator between the final-stage power amplifier and the antenna. Such a circulator may function to reduce or eliminate exposure of the power amplifier to the reverse interference by directing incident interfering signals from the antenna away from the power amplifier, thus avoiding impairments to the amplifier's performance.

Unfortunately, however, conventional circulators are relatively large and expensive components, which tend to increase the overall size and cost of an RFFE system. Accordingly, what are needed are methods and apparatus that enable the design of relatively compact and inexpensive RFFE systems that are resilient to reverse interference from harsh radio environments.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 is a table that correlates three states of a switchable impedance circuit with three operational modes for the multiple-mode power amplifier, in accordance with an example embodiment;

DETAILED DESCRIPTION

Figure 1:
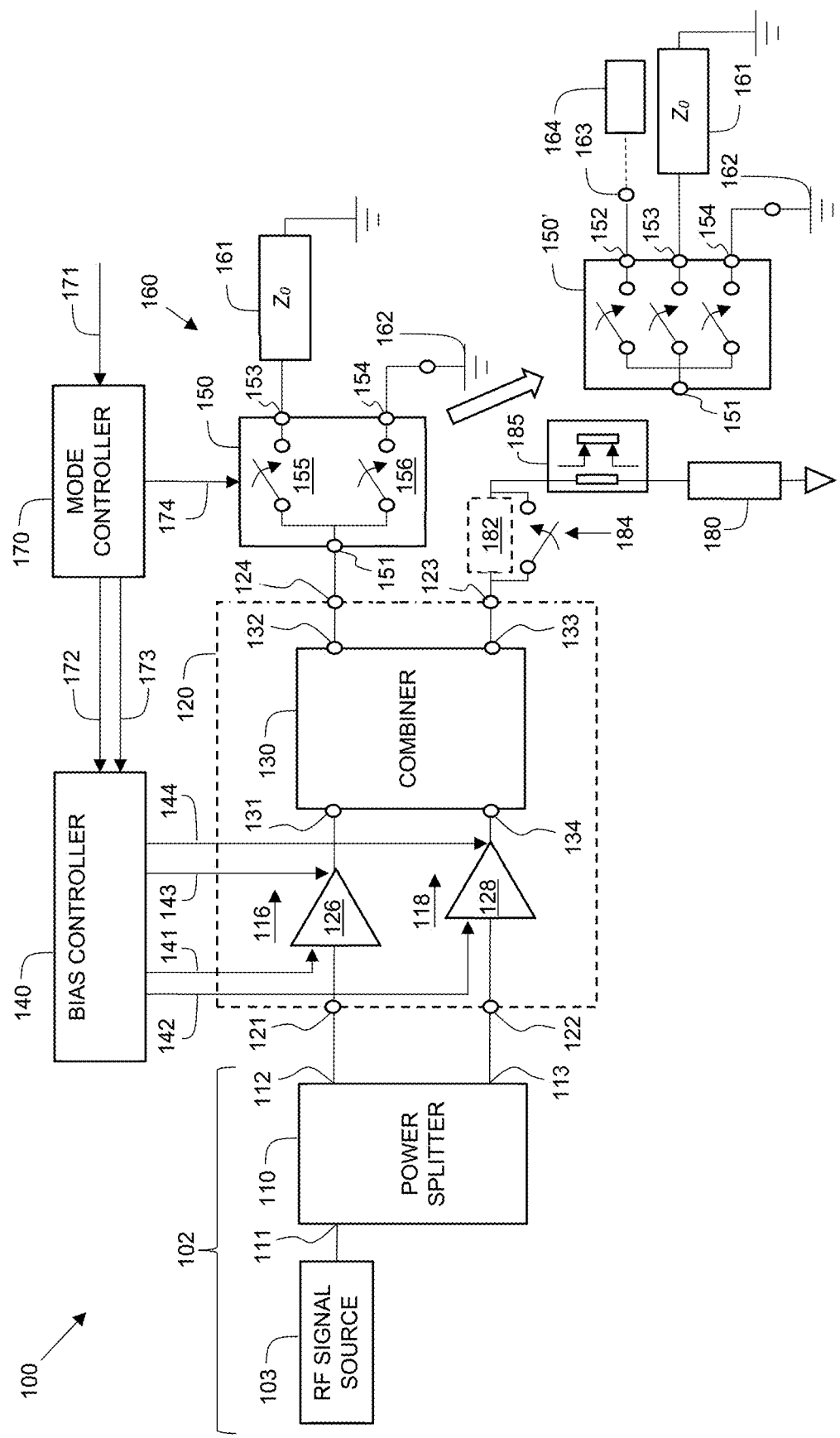
FIG. 1 is a schematic circuit diagram of a portion of an RFFE system with a multiple-mode power amplifier, in accordance with an example embodiment.

Embodiments of the present invention include a multiple-mode power amplifier (PA) that may be included, for example, as a power amplifier in an RF front end (RFFE) subsystem in a base station of a cellular communication system. The multiple-mode power amplifier embodiments include at least two amplification paths and output combiner circuitry that functions to combine amplified RF signals from the amplification paths. According to an embodiment, the amplifier may be configured (and reconfigured) to operate as a balanced power amplifier, as a parallel Doherty power amplifier, or as a series Doherty power amplifier. More specifically, the multiple-mode power amplifier of the present invention may be configured and reconfigured to operate in at least three operational modes: 1) a balanced power amplifier mode; 2) a parallel Doherty power amplifier mode; and 3) a series Doherty power amplifier mode. As used herein, and particularly in the claims, reference is made to a "first type" of Doherty power amplifier and a "second type" of Doherty power amplifier. It should be understood that the "first type" of Doherty power amplifier, as the term is used in the claims, may refer to either a parallel or a series Doherty power amplifier. Similarly, the "second type" of Doherty power amplifier, as the term is used in the claims, also may refer to either a parallel or a series Doherty power amplifier. Essentially, in the claims, the use of the terms "first type" and "second type" are used to indicate that the amplifier may be configured into two different types of Doherty power amplifiers.

The operational mode of the multiple-mode power amplifier may be controlled by selectively coupling one of multiple terminations to the amplifier's output combiner circuitry and providing appropriate bias voltages to the power transistors in the amplification paths. According to various embodiments, the output combiner circuitry may be implemented with a multiple-port power combiner, where the isolated port of the combiner is terminated by a multiple-way switchable impedance circuit. By modifying the state of a multiple-way switch of the switchable impedance circuit and controlling the biasing of power transistors within each of the amplification paths, the operating mode of the amplifier can be reconfigured between the balanced power amplifier mode, the parallel Doherty power amplifier mode, and the series Doherty power amplifier mode.

In a particular embodiment, the output combiner circuitry is implemented with a 4-port RF power combiner (e.g., a 3 dB hybrid coupler, a coupled line coupler, a branch-line coupler, or another suitable combiner), and the isolated port of the combiner is terminated by a switchable impedance circuit. The switchable impedance circuit includes a two-way or three-way switch with an input terminal and two or three output terminals, each coupled to a different termination. In some embodiments, the switchable impedance circuit may be controlled into a first state to couple the isolated port to a terminating system impedance (e.g., $Z_0$, the system impedance for which the combiner circuitry was designed, such as a 50 Ohm impedance), a second state to couple the isolated port to an open circuit impedance (e.g., infinite impedance), and a third state to couple the isolated port to a short circuit impedance, such as a ground reference node (i.e., to provide a short circuit between the isolated port and system ground). When the switchable impedance is set in the first (terminating system impedance) state and appropriate bias voltages are provided to the power transistors, the power amplifier will be configured as a balanced power amplifier. Additionally, when the output combiner circuitry is a 3 dB hybrid coupler or a coupled line coupler (e.g., couplers 300, 400, FIGS. 3, 4), and when the switchable impedance circuit is set in the second (open) or third (short) states and appropriate bias voltages are provided to the power transistors, the power amplifier will be configured as a parallel or series Doherty power amplifier, respectively. Conversely, when the output combiner circuitry is a branch-line coupler (e.g., coupler 500, FIG. 5), and when the switchable impedance circuit is set in the second (open) or third (short) states and appropriate bias voltages are provided to the power transistors, the power amplifier will be configured as a series or parallel Doherty power amplifier, respectively.

By enabling the selection of multiple operating modes, the various embodiments of multiple-mode power amplifiers disclosed herein may have significant performance advantages over conventional, fixed operating mode power amplifiers. For example, when it is important to achieve elevated back-off efficiency, the multiple-mode power amplifier may be configured as a Doherty power amplifier. Furthermore, the ability to change the amplifier operating mode between series and parallel Doherty amplifier configurations may allow the system to compensate for load-mismatch.

The multiple distinct operating modes may be selected depending on radio system operating conditions and environment, in an embodiment. Accordingly, the multiple-mode power amplifier may be operated to mitigate potential amplifier performance degradation based on the presence and relative severity of reverse interference, such as incident interfering signals from the antenna. When left unaddressed, such reverse interference may, for example, result in significant load mismatch and the generation of reverse intermodulation distortion (IMD) products. Embodiments of the present invention enable the multiple-mode power amplifier to be configured as a balanced power amplifier, for example, when significant reverse interference is anticipated or detected. When configured as a balanced power amplifier, the multiple-mode power amplifier inherently may provide protection against reverse interference by reducing the amplifier's sensitivity to load-mismatch, and by combining reverse IMD products with opposite phase, thus cancelling out at least some of the opposite-phase IMD products.

The multiple-mode power amplifier described herein may enable RFFE system architectures in which a conventional protective circulator is not present. As discussed previously, some conventional RFFE systems include a circulator between the final-stage power amplifier and the antenna. Such a circulator may function to reduce or eliminate exposure of the power amplifier to incident interfering signals from the antenna (i.e., reverse interference). More particularly, a circulator directs incident interfering signals from the antenna away from the power amplifier, thus avoiding impairments to the amplifier's performance resulting from load mismatch and the generation of reverse IMD products.

Embodiments of the present invention may enable RFFE system designs that exclude a circulator. Removing a protective circulator may not be particularly problematic when the multiple-mode power amplifier is configured as a balanced power amplifier (e.g., in the presence of significant interference) because, as mentioned above, a balanced power amplifier inherently provides protection against reverse interference. However, removal of a protective circulator when the multiple-mode power amplifier is configured as a parallel or series Doherty power amplifier may make the amplifier more susceptible to load mismatch, which in turn may result in efficiency penalties. However, according to various embodiments, and as discussed in detail below, some or all of the efficiency may be restored by performing voltage-based compensation.

A significant performance advantage of configuring the multiple-mode power amplifier as a Doherty power amplifier is the elevated efficiency in back-off, when compared with the efficiency of a balanced power amplifier. Both a parallel and a series Doherty power amplifier may provide such an advantage. However, by having the ability to toggle between both parallel and series Doherty amplifier modes, in accordance with an embodiment, voltage-based compensation is enabled for load-mismatches on both sides of the Smith-chart (i.e., corresponding to impedances that are lower and higher than the nominal impedance). In the presence of load-mismatch, appropriate voltage-scaling of amplifiers 126, 128 may be utilized to, at least in part, restore the Doherty efficiency versus power characteristics, as will be described in detail later. That said, in an RFFE system in which a circulator is present, voltage-based compensation may or may not be implemented.

The multiple-mode power amplifier embodiments described herein may be applied to the final amplification stage of an RFFE system, and/or to any preceding driver amplifier stage. For example, an embodiment of a multiple-mode power amplifier may be implemented in a driver amplifier stage (i.e., an amplifier stage that provides a pre-amplified RF signal to a final amplification stage) of an RFFE system in a cellular base station. In such a system, when the base station is in a low-traffic mode, the final amplification stage may be bypassed, and the driver amplifier stage effectively becomes the final amplification stage. When the driver amplifier stage is implemented as an embodiment of a multiple-mode power amplifier, the driver amplifier stage may be configured as a balanced power amplifier in the presence of a harsh radio environment. Alternatively, when the radio environment is less harsh, the multiple-mode driver amplifier stage may be configured as a Doherty power amplifier, thus allowing the amplifier to further restore back-off efficiency, even in low-traffic scenarios.

Typically, a driver stage amplifier is designed to be linear and load-mismatch resilient, rather than efficient. Accordingly, when the multiple-mode power amplifier is being utilized as a driver stage amplifier (e.g., to a final stage amplifier 182, FIGS. 1, 2), configuring the multiple-mode amplifier as a balanced amplifier may be preferred. However, when traffic is low and the multiple-mode power amplifier is being utilized as a final stage amplifier (e.g., final stage amplifier 182, FIGS. 1, 2 is being bypassed through switch 184), embodiments of the present invention offer a convenient way to re-configure the multiple-mode amplifier as a Doherty power amplifier.

Figure 2:
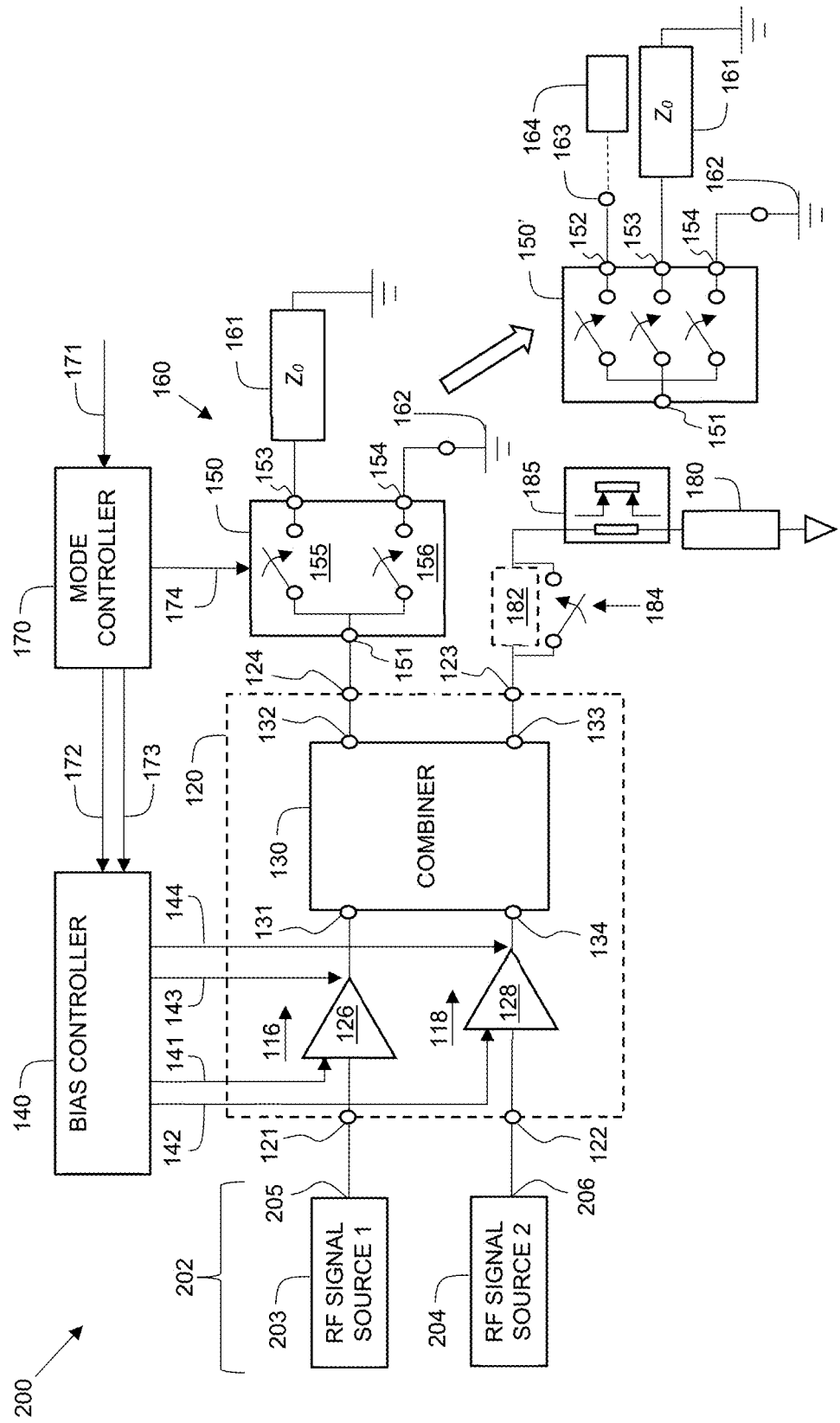
FIG. 2 is a schematic circuit diagram of a portion of an RFFE system with a multiple-mode power amplifier, in accordance with another example embodiment.

FIGS. 1 and 2 are schematic circuit diagrams of portions of RFFE systems 100, 200, each including an input circuit 101, 102, a multiple-mode RF power amplifier 120, and a switchable impedance circuit 160, in accordance with various example embodiments. Basically, the input circuit 101, 102 is configured to provide first and second RF signals to the power amplifier 120, the power amplifier 120 is configured to amplify and combine the first and second RF signals, and the switchable impedance circuit 160 is configured to connect one of several different terminations to the power amplifier 120, where the selected termination at least partially defines the operational mode of the amplifier 120.

Except for the input circuits 102, 202 to the multiple-mode RF power amplifiers 120, RFFE systems 100, 200 have many elements that may be identical, and such elements are identified with the same reference numbers throughout the Figures. Accordingly, the detailed description of any particular element, including alternate embodiments associated with that element, applies to all Figures in which the element is depicted. For the purpose of brevity, the description of all elements will not be repeated for each Figure, but instead the detailed description is intended to be incorporated into the descriptions of each Figure in which an identically-numbered element is present.

As mentioned above, RFFE systems 100, 200 each include an input circuit 102, 202, and a multiple-mode RF power amplifier 120, where each amplifier 120 includes first and second amplification paths 116, 118 and combiner circuitry 130. Further, each amplifier 120 is coupled to a switchable impedance circuit 160, which may be controlled according to an embodiment to change the operational mode of the amplifier 120, as will be described in detail later.

The input circuits 102, 202 of the RFFE systems 100, 200 are the primary differentiating features of RFFE systems 100, 200. More particularly, the input circuit 102 of RFFE system 100 (FIG. 1) includes an RF signal source 103 and a power splitter 110 (e.g., a 3 dB quadrature (90 degree) splitter). The RF signal source 103 may include, for example, a signal processor, a digital-to-analog converter, one or more frequency upconverters, a driver stage amplifier in the same power amplifier lineup, and other circuitry, which are configured to produce an RF signal for amplification and transmission over an air interface. Specifically, the RF signal source 103 provides an input RF signal (also referred to as a "pre-split input RF signal") to an input 111 of power splitter 110, and power splitter 110 divides the power of the pre-split input RF signal into first and second RF signals at outputs 112, 113 of the power splitter 110. In some embodiments, the power splitter 110 equally divides the power of the input RF signal between the amplification paths 116, 118, such that roughly one half of the input signal power is provided to each amplification path 116, 118 (e.g., for a symmetric amplifier). Alternatively, the power splitter 110 may divide the power unequally (e.g., for an asymmetric amplifier). According to an embodiment, the power splitter 110 is a 3 dB quadrature splitter, which may produce the first and second RF signals with a phase difference between the signals (e.g., about a 90 degree phase difference). Alternatively, RFFE system 100 may include one or more phase delay elements to achieve a desired phase difference between the first and second RF signals before they are provided to the amplifier system inputs 121, 122 of the multiple-mode RF power amplifier 120.

Conversely, and referring to FIG. 2, the input circuit 202 of RFFE system 200 does not include a power splitter, but instead includes coherent first and second RF signal sources 203, 204. The first and second RF signal sources 203, 204 each may include, for example, a signal processor, a digital-to-analog converter, one or more frequency upconverters, and other circuitry, which are configured to produce an RF signal for amplification and transmission over an air interface. Some of this circuitry may be shared between the first and second RF signal sources 203, 204. Either way, the first RF signal source 203 provides a first RF signal for amplification by the first amplification path 116, and the second RF signal source 204 provides a second RF signal for amplification by the second amplification path 118.

According to an embodiment, the first and second RF signal sources 203, 204 produce similar or identical first and second RF signals, although the first and second RF signal sources 203, 204 may produce the first and second RF signals with a phase difference between the signals (e.g., about a 90 degree phase difference). In addition, the first and second RF signal sources 203, 204 may be produced with substantially equal power (e.g., for a symmetric amplifier), or with unequal power (e.g., for an asymmetric amplifier).

Either way, in both RFFE systems 100, 200, first and second RF signals are provided to first and second amplifier system inputs 121, 122 of the multiple-mode RF power amplifier 120. As indicated above, the first and second RF signals may be provided to the amplifier system inputs 121, 122 with about a 90 degree phase difference.

The multiple-mode RF power amplifier 120 includes the first and second amplifier system inputs 121, 122, an amplifier system output 123, a termination connection port 124, first and second amplification paths 116, 118, and combiner circuitry 130, in an embodiment. The first amplification path 116 includes a single-stage or multiple-stage first power amplifier 126 coupled between the first amplifier system input 121 and a first port 131 of the combiner circuitry 130 (also referred to as a "first combiner port" 131). The first power amplifier 126 is configured to receive, at an input to the first power amplifier 126, the first RF signal from the first amplifier system input 121, to amplify the first RF signal, and to provide a first amplified RF signal at an output of the first power amplifier 126, which in turn is coupled to the first port 131 of the combiner circuitry 130. Similarly, the second amplification path 118 includes a single-stage or multiple-stage second power amplifier 128 coupled between the second amplifier system input 122 and a fourth port 134 of the combiner circuitry 130 (also referred to as a "fourth combiner port" 134). The second power amplifier 128 is configured to receive, at an input to the second power amplifier 128, the second RF signal from the second amplifier system input 122, to amplify the second RF signal, and to provide a second amplified RF signal at an output of the second power amplifier 128, which in turn is coupled to the fourth port 134 of the combiner circuitry 130. According to an embodiment, the outputs of both amplifiers 126, 128 are matched to the system impedance, $Z_0$.

Each of the first and second power amplifiers 126, 128 include one or more power transistors (e.g., each corresponding to an amplifier stage), which are the primary amplifier components of the power amplifiers 126, 128. According to an embodiment, the transistors in power amplifiers 126, 128 are similarly sized (e.g., symmetrical), although the transistors in power amplifiers 126, 128 may be differently sized, in other embodiments. According to an embodiment, each of the power transistors within amplifiers 126, 128 may include a control terminal and two current conducting terminals, where the current conducting terminals are spatially and electrically separated by a variable-conductivity channel. For example, each transistor may be a field effect transistor (FET), although embodiments using bipolar junction transistors (BJTs) or other types of transistors could be implemented as well. Using nomenclature associated with FETs, each transistor includes a gate terminal (control terminal), a drain terminal (a first current conducting terminal), and a source terminal (a second current conducting terminal). According to an embodiment, and using nomenclature typically applied to FETs in a non-limiting manner, the gate terminal(s) of transistor(s) within amplifier 126 is/are coupled to the first amplifier system input 121, the drain terminal(s) of transistor(s) within amplifier 126 is/are coupled to the first combiner port 131 of combiner circuitry 130 (described later), and the source terminal(s) of transistor(s) within amplifier 126 is/are coupled to ground (or another voltage reference). Similarly, the gate terminal(s) of transistor(s) within amplifier 128 is/are coupled to the second amplifier system input 122, the drain terminal(s) of transistor(s) within amplifier 128 is/are coupled to the fourth combiner port 134 of combiner circuitry 130, and the source terminal(s) of transistor(s) within amplifier 128 is/are coupled to ground (or another voltage reference). Through the variation of control signals provided to the gate terminals of each of the above-mentioned transistors, the current between the current conducting terminals of each transistor may be modulated.

According to various embodiments, each amplifier stage or a final amplifier stage of either or both amplifiers 126, 128 may be implemented, for example, using a FET. For example, one or more amplifier stages may be implemented with a III-V field effect transistor (e.g., a HEMT), such as a gallium nitride (GaN) FET (or another type of III-V transistor, including a GaAs FET, a GaP FET, an InP FET, or an InSb FET). In addition or alternatively, one or more amplifier stages may be implemented as a silicon-based FET (e.g., a laterally diffused metal oxide semiconductor (LDMOS) FET) or a silicon germanium (SiGe) FET, in some embodiments.

To ensure proper operation in whichever mode the multiple-mode power amplifier 120 currently is configured (i.e., the "current operational mode"), gate bias voltages that are needed for proper operation within the current operational mode are provided by a bias controller 140 over bias voltage lines 141, 142 to the input terminals (e.g., gate terminals) of the power transistors within each amplifier 126, 128. The bias controller 140 also is configured to provide drain bias voltages over bias voltage lines 143, 144 to the output terminals (e.g., drain terminals) of the power transistors within each amplifier 126, 128. In some cases, such as when the current operational mode is a balanced amplifier mode, the bias controller 140 may provide a nominal drain bias voltage (e.g., 48 volts, or some other voltage) over bias voltage lines 143, 144. In other cases, such as when the current operational mode is either a parallel or series Doherty amplifier mode, and as will be described later in conjunction with FIG. 6, the bias controller 140 may scale the drain bias voltages for amplifiers 126, 128 higher or lower (i.e., higher or lower than the nominal drain bias voltage), depending on increases and decreases in the load impedance, $R_L$. According to various embodiments described in more detail below, the RFFE system 100, 200 is configured to perform drain bias voltage scaling, as needed, to restore the output impedance matching for the amplifiers 126, 128, and thus to restore efficiency. This drain bias voltage scaling capability, in conjunction with the ability to operate in both parallel and series Doherty amplifier modes, enables the RFFE system 100, 200 to perform voltage-based compensation for load mismatches on both sides of the Smith chart, and thus to avoid de-tuning the amplifier 120 and operation at lower efficiency levels.

In addition to controlling the gate and drain bias voltages, and as will be described in more detail below, the mode controller 170 also controls the switchable impedance circuit 160 to provide an appropriate termination to the amplifier 120 based on the current operational mode. In other words, configuration in a particular operational mode may include both providing appropriate bias voltages over lines 141, 142 and providing a mode-dependent termination to the amplifier 120 using the switchable impedance circuit 160.

For example, when the power amplifier 120 is configured in a balanced power amplifier mode, the power transistors within amplifiers 126, 128 may be provided with gate bias voltages ($V_{G1}$ for amplifier 126, and $V_{G2}$ for amplifier 128) over lines 141, 142 that configure both of the amplifiers 126, 128 as class AB amplifiers. In the balanced power amplifier mode, the switchable impedance circuit 160 is controlled to terminate the power amplifier 120 with the system impedance, $Z_0$ (i.e., amplifier 120 is terminated with a terminating system impedance 161), as will be described in more detail later.

Conversely, when the power amplifier 120 is configured in a parallel Doherty power amplifier mode, the power transistors within each amplifier 126, 128 may be provided with gate bias voltages ($V_{G1}$ for amplifier 126, and $V_{G2}$ for amplifier 128) over lines 141, 142 that configure the amplifiers 126, 128 as class AB and class C amplifiers, respectively. More specifically, when the power amplifier 120 is configured in a parallel Doherty power amplifier mode, the power transistor(s) within amplifier 126 may be provided with gate bias voltage(s) over line(s) 141 that configure amplifier 126 as a class AB amplifier, and the power transistor(s) within amplifier 128 may be provided with gate bias voltage(s) over line(s) 142 that configure amplifier 128 as a class C amplifier. Accordingly, amplifier 126 functions as the carrier amplifier, and amplifier 128 functions as the peaking amplifier in the parallel Doherty power amplifier mode. In the parallel Doherty power amplifier mode, the switchable impedance circuit 160 is controlled to terminate the power amplifier 120 with an open circuit impedance when the combiner 130 is implemented as a hybrid coupler (e.g., coupler 300, FIG. 3) or a coupled line structure (e.g., structure 400, FIG. 4). Conversely, in the parallel Doherty power amplifier mode, the switchable impedance circuit 160 is controlled to terminate the power amplifier 120 with a short circuit impedance when the combiner 130 is implemented as a branch line coupler (e.g., coupler 500, FIG. 5), as will be described in more detail later.

Further, when the power amplifier 120 is configured in a series Doherty power amplifier mode, the power transistors within each amplifier 126, 128 may be provided with gate bias voltages ($V_{G1}$ for amplifier 126, and $V_{G2}$ for amplifier 128) over lines 141, 142 that configure the amplifiers 126, 128 as class C and class AB amplifiers, respectively. More specifically, when the power amplifier 120 is configured in a series Doherty power amplifier mode, the power transistor(s) within amplifier 126 may be provided with gate bias voltage(s) over line(s) 141 that configure amplifier 126 as a class C amplifier, and the power transistor(s) within amplifier 128 may be provided with gate bias voltage(s) over line(s) 142 that configure amplifier 128 as a class AB amplifier. Accordingly, amplifier 126 functions as the peaking amplifier, and amplifier 128 functions as the carrier amplifier in the series Doherty power amplifier mode. In the series Doherty power amplifier mode, the switchable impedance circuit 160 is controlled to terminate the power amplifier 120 with a short circuit impedance when the combiner 130 is implemented as a hybrid coupler (e.g., coupler 300, FIG. 3) or a coupled line structure (e.g., structure 400, FIG. 4). Conversely, in the series Doherty power amplifier mode, the switchable impedance circuit 160 is controlled to terminate the power amplifier 120 with an open circuit impedance when the combiner 130 is implemented as a branch line coupler (e.g., coupler 500, FIG. 5), as will be described in more detail later.

The combiner circuitry 130 includes first, second, third, and fourth combiner ports 131, 132, 133, 134. As indicated above, the first and fourth combiner ports 131, 134, also referred to as first and second "combiner input ports," respectively, are coupled to the outputs of the first and second power amplifiers 126, 128, respectively. Further, the third combiner port 133, also referred to as a "combiner output port," is coupled to the amplifier system output 123. As will be described in further detail below, the second combiner port 132, also referred to as the "isolated port," is coupled to the termination connection port 124 of the multiple-mode power amplifier 120. The termination connection port 124 (and thus the second combiner port 132), in turn, is coupled to the switchable impedance circuit 160, the functionality of which will be described later.

Essentially, the combiner circuitry 130 is configured to receive the first and second amplified RF signals through the first and fourth combiner ports 131, 134, and to produce a combined amplified RF signal at the third combiner port 133. When the multiple-mode power amplifier 120 corresponds to the final amplification stage of the RFFE system 100, 200, the third combiner port 133 and the amplifier system output 123 may be coupled to a load 180, such as an antenna. In such an embodiment, the combined amplified RF signal produced at the third combiner port 133 is conveyed through the amplifier system output 123 to the load/antenna 180, which radiates the combined amplified RF signal over the air interface.

Alternatively, as mentioned above, the multiple-mode power amplifier 120 may correspond to a driver amplifier stage of the RFFE system 100, 200, in which case the third combiner port 133 and the amplifier system output 123 may be coupled to a final-stage power amplifier, represented by optional box 182, which in turn may be coupled to the load 180 (e.g., an antenna). In such an embodiment, the final-stage power amplifier 182 may be bypassed at some times during operation (e.g., when the system is in a low-traffic mode), as indicated with bypass switch 184. In such a configuration, the multiple-mode power amplifier 120 effectively becomes a final amplification stage (i.e., the system is set in a "final stage configuration"), even though at other times during operation (i.e., when the final-stage power amplifier 182 is not bypassed), the multiple-mode power amplifier 120 operates as a driver amplifier stage (i.e., the system is set in a "driver stage configuration").

According to an embodiment, a load monitoring circuit 185 is coupled between the third combiner port 133 and the load 180. The load monitoring circuit 185 may be configured to detect the reflected signal, b, in amplitude and phase from the load 180 and, in some embodiments, the transmitted signal, a, in amplitude and phase produced at the amplifier system output 123. The load monitoring circuit 185 may be communicatively coupled to the mode controller 170, and may communicate information to the mode controller 170 (e.g., through input 171) that indicates the amplitudes and phases of the reflected signal, the forward signal, or both. As will be discussed in detail below, this information enables the mode controller 170 to determine the quality of the radio environment. For example, the mode controller 170 may determine whether or not the radio environment is "harsh" (e.g., affected by powerful in-band or out-of-band interferers) based on the magnitude of the reflected signal, |b|, and/or the occurrence of interfering signals in the frequency spectrum of that reflected signal. Further, the mode controller 170 may determine whether or not the tuning state of the load 180 has changed by calculating the complex reflection coefficient, Gamma_L, and determining whether the complex reflection coefficient has changed significantly (e.g., increased or decreased by at least five percent) or has exceeded a threshold. For example, the load 180 may become de-tuned due to weather changes, objects in proximity to the load 180, and so on. More specifically, the controller 170 may calculate Gamma_L as the ratio of b to a in amplitude and phase (i.e., Gamma_L=b/a). Gamma_L enables the controller 170 to calculate the change of the load impedance, $R_L$, along with the sign of that change, and thus to determine the tuning state of the load 180 and in which operational mode the amplifier 120 should be configured.

Figures 3, 4, 5:
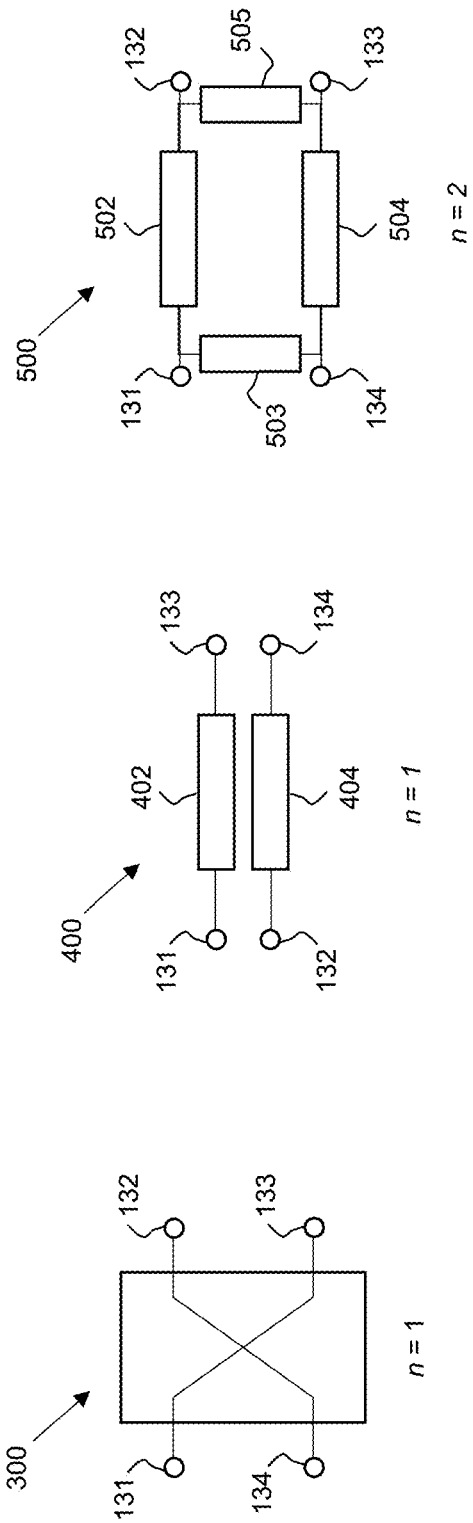
FIG. 3 illustrates a hybrid coupler that may be used in an embodiment of a multiple-mode power amplifier.
FIG. 4 illustrates a coupled line structure that may be used in an embodiment of a multiple-mode power amplifier.
FIG. 5 illustrates a branch line coupler that may be used in an embodiment of a multiple-mode power amplifier.

In various embodiments, and referring also to FIGS. 3-5, the combiner circuitry 130 may include any of several types of quadrature types of combiners, each of which is configured to phase-align and combine two input RF signals that are received out of phase by 90 degrees (i.e., the first and second amplified RF signals received through the first and fourth combiner ports 131, 134 are 90 degrees out of phase with each other). Combining the input RF signals results in an amplified RF signal at the third combiner port 133.

In various embodiments, the combiner circuitry 130 may include any structure that features the following S-parameter matrix:

$$\begin{bmatrix} b_1 \\ b_2 \\ b_3 \\ b_4 \end{bmatrix} = e^{-j(n-1)\frac{\pi}{2}} \cdot \frac{1}{2} \cdot \begin{bmatrix} 0 & \sqrt{2} & -\sqrt{2}j & 0 \\ \sqrt{2} & 0 & 0 & -\sqrt{2}j \\ -\sqrt{2}j & 0 & 0 & \sqrt{2} \\ 0 & -\sqrt{2}j & \sqrt{2} & 0 \end{bmatrix} \cdot \begin{bmatrix} a_1 \\ a_2 \\ a_3 \\ a_4 \end{bmatrix} \quad \text{[Equation 1]}$$

with $n \in \mathbb{Z}$, and where the characteristic impedance of the S-parameters ($Z_0$) may be, but is not limited to 50 Ohms. By saying that the combiner circuitry 130 is designed for a system impedance of $Z_O$, this means that the combiner circuitry 130 features the S-parameters as per Equation 1 relative to a reference impedance $Z_O$ at all four ports. For example, the combiner circuitry 130 may include a four-port device selected from a 3 dB 90 degree hybrid coupler (e.g., coupler 300, FIG. 3), a 3 dB 90 degree coupled line structure (e.g., coupler 400, FIG. 4), a branch line coupler (e.g., coupler 500, FIG. 5), or another suitable type of combiner (e.g., a Lange coupler). It may be verified that the structures in FIGS. 3-5, described below, are three examples of circuits that feature the S-parameter matrix of Equation 1, with the ports connected as the numbering in FIGS. 1-2 indicates.

Referring also to FIG. 3, combiner circuitry 130 may be implemented as a four-port, 3 dB 90 degree hybrid coupler 300 where n=1 (Equation 1), according to an embodiment. Coupler 300 has a first combiner port 131 coupled to the output of the first power amplifier 126, a fourth combiner port 134 coupled to the output of the second power amplifier 128, and a third combiner port 133 coupled to the amplifier system output 123, as described above. The second combiner port 132 is the isolated port of the hybrid coupler 300, which is coupled to the switchable impedance circuit 160.

Referring also to FIG. 4, according to another embodiment, combiner circuitry 130 may be implemented as a 3 dB 90 degree coupled line structure 400 where n=1 (Equation 1). Coupled line structure 400 includes two parallel, coupled transmission lines 402, 404, each with an electrical length of 90 degrees at the fundamental frequency of operation, f0, of the amplifier 120. A first end of the first coupled line 402 corresponds to the first combiner port 131, which is coupled to the output of the first power amplifier 126. A second end of the first coupled line 402 corresponds to the third combiner port 133, which is coupled to the amplifier system output 123. A first end of the second coupled line 404 corresponds to the second combiner port 132 (or the isolated port), which is coupled to the switchable impedance circuit 160. Finally, a second end of the second coupled line 404 corresponds to the fourth combiner port 134, which is coupled to the output of the second power amplifier 128. Although the 3 dB 90 degree coupled line structure 400 includes transmission lines 402, 404 that are parallel across their entire lengths, in an alternate embodiment, the coupled lines 402, 404 may include a cross-over somewhere along their lengths to reverse the physical orientation of the combiner ports.

Referring also to FIG. 5, according to yet another embodiment, combiner circuitry 130 may be implemented as a branch line coupler 500 where n=2 (Equation 1). The branch line coupler 500 may include four connected transmission lines 502, 503, 504, 505, each having an electrical length of λ/4 (i.e., 90 degrees) at the fundamental frequency of operation, f0, of the amplifier 120. In alternate embodiments, each line 502-505 may have an electrical length other than λ/4 (e.g., ¾λ, ⅝λ, ⅞λ, and so on). The transverse lines 503, 505 each have an impedance of $Z_O$ (e.g., 50 ohms), and the longitudinal lines 502, 504 each have an impedance of $Z_O/\sqrt{2}$ (e.g., 35.4 ohms). The first combiner port 131 is coupled to the output of the first power amplifier 126. The second combiner port 132 is the isolated port of the branch line coupler 500, which is coupled to the switchable impedance circuit 160. The third combiner port 133 is coupled to the amplifier system output 123, as described above. Finally, the fourth combiner port 134 is coupled to the output of the second power amplifier 128.

Each of the example combiner circuits 300, 400, 500 described above include two input ports 131, 134, an output port 133, and an isolated port 132. As discussed earlier, the first and fourth ports 131, 134 are coupled to the outputs of amplifiers 126 and 128, respectively. The third combiner port 133 is coupled to the amplifier system output 123, and the amplifier system output 123 may be coupled to a final-stage power amplifier (i.e., when amplifier 120 is a driver amplifier), represented by optional box 182, which in turn may be coupled to the load 180 (e.g., an antenna). Alternatively, amplifier 120 may be the final-stage power amplifier, and amplifier 120 may be coupled directly to the load 180.

The second combiner port 132 is the isolated port of combiner circuitry 130, and this port 132 is coupled through the termination connection port 124 to the switchable impedance circuit 160. As will be described in more detail below, the switchable impedance circuit 160 enables one of a plurality of terminations (or impedances) to be coupled to the second combiner port 132 (i.e., the isolated port), and the termination that is coupled to the second combiner port 132 at any given time determines the configuration or operational mode of the amplifier 120. More specifically, by changing the termination that is coupled to the second combiner port 132, the amplifier 120 may be configured and reconfigured to operate in at least three operational modes: 1) a balanced power amplifier mode; 2) a parallel Doherty power amplifier mode; and 3) a series Doherty power amplifier mode.

According to an embodiment, the switchable impedance circuit 160 includes a multiple-way RF switch 150, which includes a switch input terminal 151 and two switch outputs 153, 154. The switch 150 further includes first and second single pole, single throw (SPST) RF switches 155, 156, each with an input terminal coupled to the switch input terminal 151, and an output terminal coupled to either the first or the second switch output terminal 153, 154. Alternatively, the switch 150 may include a single pole, double throw, SPDT, RF switch. In either embodiment, a first terminating system impedance 161 (e.g., an impedance having a magnitude equal to the terminating system impedance, $Z_O$, such as 50 ohms) is coupled to the first switch output terminal 153, and a second impedance 162, or more particularly a minimal or near-zero impedance such as a ground reference (referred to herein as a "short circuit impedance termination"), is coupled to the second switch output terminal 154. In other words, the two switch outputs 153, 154 are terminated, respectively, in the system impedance, $Z_O$, or in a short circuit impedance (or a minimal or near-zero impedance).

In an alternate embodiment, the switch 150 of the switchable impedance circuit 160 includes a multiple-way RF switch 150', which includes a switch input terminal 151 and three switch output terminals 152, 153, 154, as shown in the lower right corner of FIGS. 1 and 2. In such an embodiment, the switch 150' may include three single pole, single throw (SPST) RF switches (not numbered), each with an input terminal coupled to the switch input terminal 151, and an output terminal coupled to one of three switch output terminals 152, 153, 154. Alternatively, the switch 150' may include a single pole, triple throw (SP3T) switch with an input terminal coupled to the switch input terminal 151, and three output terminals, each coupled to one of the three switch output terminals 152, 153, 154. In either embodiment, an open circuit impedance node 163 is coupled to the first switch output terminal 152, a first impedance 161 (e.g., an impedance having a magnitude equal to the terminating system impedance, $Z_O$) is coupled to the second switch output terminal 153, and a second impedance 162, or more particularly a short circuit impedance in the form of a minimal or near-zero impedance, such as a ground reference, is coupled to the third switch output terminal 154. In other words, the three switch output terminals 152, 153, 154 are terminated, respectively, in an open circuit impedance, in the system impedance, $Z_O$, or in a short circuit impedance (or a minimal or near-zero impedance). According to some embodiments, the open circuit impedance node 163 is coupled to a true "open circuit" in the form of a very high or infinite impedance. According to other embodiments, the open circuit impedance node 163 is coupled to a variable reactive impedance circuit 164, which may be configured to provide a desired open circuit impedance at a band center frequency at combiner port 132, even in the presence of parasitic elements, such as parasitic capacitance from the switch 150' that may otherwise result in an imperfect open circuit. The variable reactive impedance circuit also may be configured to help to phase align the behavior of the combiner 130. As used herein, the term "open circuit impedance" refers either to an actual open circuit (e.g., a very high or infinite impedance) or to an open circuit impedance provided by a circuit (e.g., a variable reactive impedance circuit).

According to an embodiment, RFFE system 100, 200 further includes a mode controller 170 and the above-mentioned bias controller 140. The mode controller 170 is configured to control the operational mode in which the amplifier 120 is currently set by providing control signals to the switchable impedance circuit 160 and to the bias controller 140, in an embodiment. According to various embodiments, the mode controller 170 may form a portion of a baseband processor, which is configured to perform various radio functions (e.g., signal modulation, encoding, frequency shifting, and so on).

The mode controller 170 may determine which operational mode to establish based, for example, on information selected from: information that characterizes the quality of the radio environment, the traffic mode, and/or the type of voltage-scaling that is desired, along with other information. In addition, the type of combiner 130 also factors into which operational mode is selected. According to an embodiment, the mode controller 170 receives one or more inputs 171, which the mode controller 170 may use to characterize the quality of the radio environment (e.g., whether significant reverse interference is present) and/or to determine the current traffic mode in which the system is operating (e.g., whether the system is operating in a low traffic mode or a high traffic mode).

As indicated above, one of the inputs 171 may include a signal with information from the load monitoring circuit 185. For example, according to an embodiment, the load monitoring circuit 185 may detect the reflected signal, b, in amplitude and phase from the load 180 and, in some embodiments, the transmitted signal, a, in amplitude and phase produced at the amplifier system output 123. The load monitoring circuit 185 may communicate information indicating the amplitude and phase of the reflected signal, the amplitude and phase of the forward signal, or both, through input 171. The reflected signal power magnitude enables the mode controller 170 to determine the quality (or harshness) of the radio environment. The amplitude and phase information for the reflected and forward signals enables the mode controller 170 to determine the tuning state of the load 180 by calculating the complex reflection coefficient, Gamma_L (i.e., Gamma_L=b/a) and the load impedance, $R_L$, along with its sign.

For example, when the radio environment is harsh (e.g., experiencing significant reverse interferers), the mode controller 170 may be configured to provide control signals that configure the amplifier 120 as a balanced power amplifier. In such a situation, the mode controller may provide a switch control signal over signal line 174, which causes the multiple-way RF switch 150 to couple the isolated port 132 of combiner circuitry 130 to termination 161 (e.g., the system impedance, $Z_O$). This will cause the isolated port 132 of the combiner circuitry 130 to be terminated in the system impedance, $Z_O$. Further, in the balanced power amplifier mode, the mode controller 170 may provide a gate bias control signal over signal line 172, which causes the bias controller 140 to provide gate bias voltages over lines 141, 142 that configure both of the amplifiers 126, 128 as class AB amplifiers. The mode controller 170 also may provide a drain bias control signal over signal line 173, which causes the bias controller 140 to provide nominal drain bias voltages over lines 143, 144. As mentioned previously, a balanced power amplifier inherently provides protection against reverse interference because the sensitivity to load-mismatch may be drastically reduced, and some reverse IMD products are combined with opposite phase and thus cancel each other out.

As another example, when the radio environment allows (e.g., the radio environment is not as harsh) and higher back-off efficiency is desired, the mode controller 170 may be configured to provide control signals that configure the amplifier 120 as either a parallel or series Doherty power amplifier. As mentioned previously, the mode controller 170 may decide to configure the amplifier 120 as a parallel Doherty power amplifier when voltage-based compensation for mismatches is desired (e.g., when Ry, is lower than nominal). In the parallel Doherty power amplifier mode, the mode controller 170 may provide a bias control signal over signal line 172, which causes the bias controller 140 to provide gate bias voltages over lines 141, 142 that configure both the amplifiers 126, 128 as class AB and class C amplifiers, respectively.

The mode controller 170 also may provide a drain bias control signal over signal line 173, which causes the bias controller 140 to provide scaled up and scaled down drain bias voltages over lines 143, 144 for amplifiers 126, 128, respectively. More specifically, and according to an embodiment, the bias controller 140 will provide a scaled up drain bias voltage (i.e., a drain bias voltage higher than the nominal drain bias voltage) to the class AB-biased amplifier 126 in the parallel Doherty power amplifier mode, and the bias controller 140 will provide a scaled down drain bias voltage (i.e., a drain bias voltage lower than the nominal drain bias voltage) to the class C-biased amplifier 128 in the parallel Doherty power amplifier mode.

The mode controller 170 also controls the state of the RF switch 150, 150' to configure the amplifier 120 as a parallel Doherty power amplifier. The way in which the mode controller configures the amplifier 120 as a parallel Doherty power amplifier depends on the type of combiner 130 that is used in the amplifier 120. For example, when the combiner 130 is implemented as a hybrid coupler (e.g., coupler 300, FIG. 3) or a coupled line structure (e.g., structure 400, FIG. 4), the mode controller 170 may configure the amplifier 120 as a parallel Doherty power amplifier by providing a switch control signal over signal line 174, which causes the multiple-way RF switch 150 to couple the isolated port 132 of combiner circuitry 130 to an open circuit impedance. For the first embodiment of the multiple-way RF switch 150, the open circuit impedance may be established by setting each switch 155, 156 in a high-impedance or open state in which neither the system impedance termination 161 nor the short circuit impedance termination 162 is coupled through the switch 150 to the isolated port 132 of the combiner circuitry 130. Instead, the isolated port 132 is coupled to an open circuit. For the alternate embodiment of the multiple-way RF switch 150', the open circuit impedance may be established by setting only the switch coupled to switch output terminal 152 in a low-impedance or closed state, thus coupling the switch input terminal 151 to a high-impedance/open circuit termination 163 or, for example, a variable reactive impedance circuit that provides an open circuit impedance at a band center frequency.

Conversely, when the combiner 130 is implemented as branch line coupler (e.g., coupler 500, FIG. 5), the mode controller 170 may configure the amplifier 120 as a parallel Doherty power amplifier by providing a switch control signal over signal line 174, which causes the multiple-way RF switch 150 to couple the isolated port 132 of combiner circuitry 130 to a short circuit impedance. For the first embodiment of the multiple-way RF switch 150, the impedance may be established by setting switch 155 in a high-impedance or open state, and setting switch 156 in a low-impedance or closed state. In this configuration, the short circuit impedance termination 162 is coupled through the switch 150 to the isolated port 132 of the combiner circuitry 130. For the alternate embodiment of the multiple-way RF switch 150', the short circuit impedance may be established by setting only the switch coupled to switch output terminal 154 in a low-impedance or closed state, thus coupling the switch input terminal 151 to the short circuit impedance termination 162.

As also mentioned previously, the mode controller 170 may decide to configure the amplifier 120 as a series Doherty power amplifier when voltage-based compensation for mismatches is desired (e.g., when Ry is higher than nominal). In the series Doherty power amplifier mode, the mode controller 170 may provide a bias control signal over signal line 172, which causes the bias controller 140 to provide gate bias voltages over lines 141, 142 that configure both the amplifiers 126, 128 as class C and class AB amplifiers, respectively.

The mode controller 170 also may provide a drain bias control signal over signal line 173, which causes the bias controller 140 to provide scaled down and scaled up drain bias voltages over lines 143, 144 for amplifiers 126, 128, respectively. More specifically, and according to an embodiment, the bias controller 140 will provide a scaled down drain bias voltage (i.e., a drain bias voltage lower than the nominal drain bias voltage) to the class C-biased amplifier 126 in the series Doherty power amplifier mode, and the bias controller 140 will provide a scaled up drain bias voltage (i.e., a drain bias voltage higher than the nominal drain bias voltage) to the class AB-biased amplifier 128 in the series Doherty power amplifier mode.

Again, the mode controller 170 also controls the state of the RF switch 150, 150' to configure the amplifier 120 as a series Doherty power amplifier. The way in which the mode controller configures the amplifier 120 as a series Doherty power amplifier depends on the type of combiner 130 that is used in the amplifier 120. For example, when the combiner 130 is implemented as a hybrid coupler (e.g., coupler 300, FIG. 3) or a coupled line structure (e.g., structure 400, FIG. 4), the mode controller 170 may configure the amplifier 120 as a series Doherty power amplifier by providing a switch control signal over signal line 174, which causes the multiple-way RF switch 150 to couple the isolated port 132 of combiner circuitry 130 to a short circuit impedance. For the first embodiment of the multiple-way RF switch 150, the short circuit impedance may be established by setting switch 155 in a high-impedance or open state, and setting switch 156 in a low-impedance or closed state, thus coupling the isolated port 132 to the short circuit impedance termination 162. This will cause the isolated port 132 of the combiner circuitry 130 to be terminated with a very low impedance (e.g., terminated to ground). For the alternate embodiment of the multiple-way RF switch 150', the short circuit impedance may be established by setting only the switch coupled to switch output terminal 154 in a low-impedance or closed state, thus coupling the switch input terminal 151 to the short circuit impedance termination 162.

Conversely, when the combiner 130 is implemented as branch line coupler (e.g., coupler 500, FIG. 5), the mode controller 170 may configure the amplifier 120 as a series Doherty power amplifier by providing a switch control signal over signal line 174, which causes the multiple-way RF switch 150 to couple the isolated port 132 of combiner circuitry 130 to an open circuit impedance. For the first embodiment of the multiple-way RF switch 150, the open circuit impedance may be established by setting each switch 155, 156 in a high-impedance or open state in which neither the system impedance termination 161 nor the short circuit impedance termination 162 is coupled through the switch 150 to the isolated port 132 of the combiner circuitry 130. Instead, the isolated port 132 is coupled to an open circuit. For the alternate embodiment of the multiple-way RF switch 150', the open circuit may be established by setting only the switch coupled to switch output terminal 152 in a low-impedance or closed state, thus coupling the switch input terminal 151 to a high-impedance/open circuit termination 163 or, for example, a variable reactive impedance circuit 164 that provides an open circuit impedance at a band center frequency.

According to an embodiment in which amplifier 120 is a driver amplifier, and the RFFE system 100, 200 further includes a final stage amplifier 182 that may be bypassed with bypass switch 184 (or another suitable bypass circuit), the mode controller 170 also may be configured to control the state of the bypass switch 184 to switch the final stage amplifier 182 into or out of the amplification path. For example, the mode controller 170 may be configured to bypass the final stage amplifier 182 when the system is in a low-traffic mode, and the mode controller 170 may be configured to couple the final stage amplifier 182 between amplifier 120 and load 180 when the system is in a high-traffic mode. According to an embodiment, the mode controller 170 may provide a control signal to bypass switch 184 over a signal line (not shown). When the bypass switch 184 is set in a first, low-impedance (or closed) state, the bypass switch 184 directly couples amplifier 120 to the load 180, while bypassing amplifier 182. When the bypass switch 184 is set in a second, high-impedance (or open) state, the final-stage amplifier 182 is coupled between amplifier 120 and the load 180.

Figure 6:
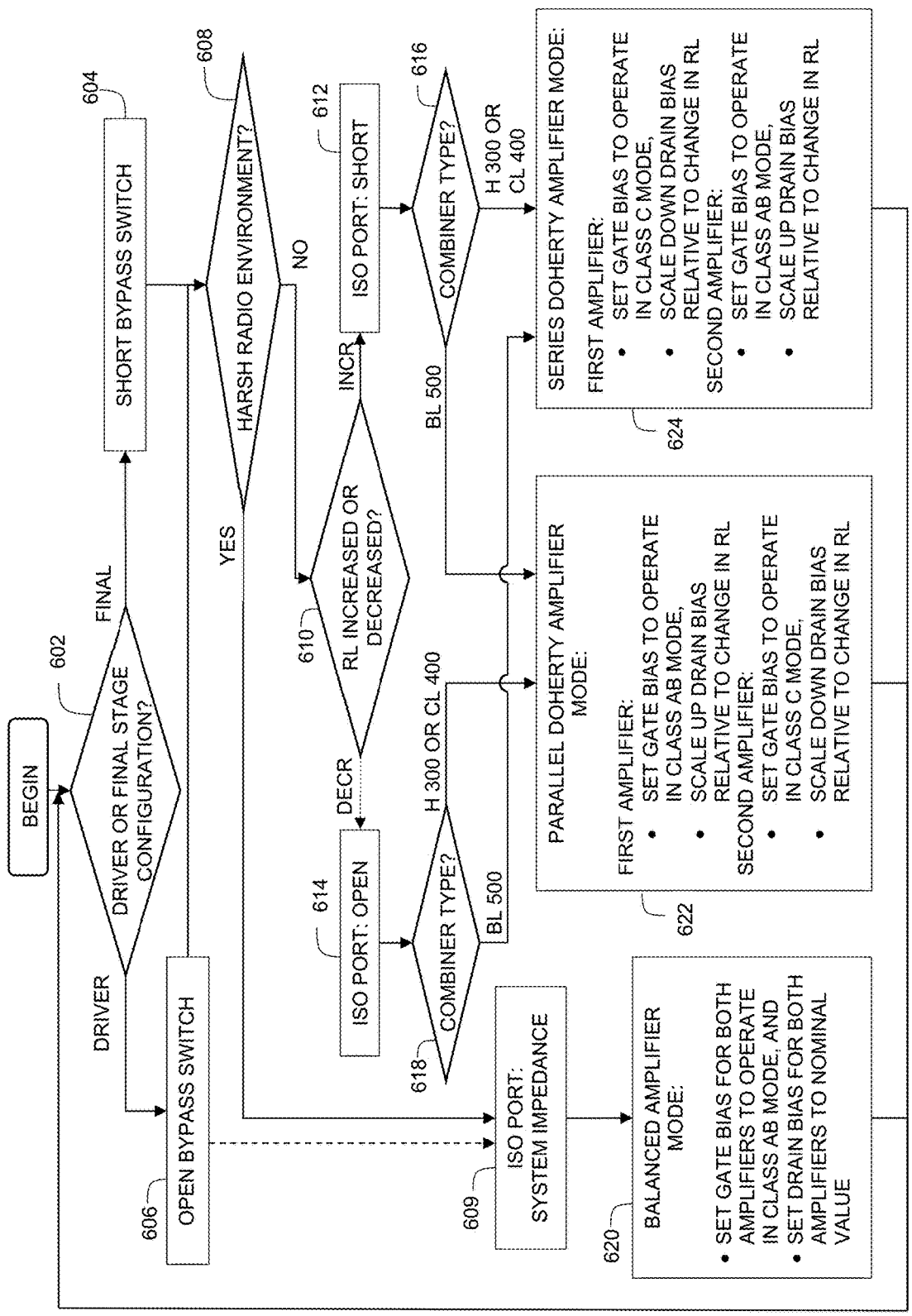
FIG. 6 is a flowchart of a method of operating a multiple-mode power amplifier, in accordance with an example embodiment.

FIG. 6 is a flowchart of a method of operating a multiple-mode power amplifier (e.g., amplifier 120, FIGS. 1, 2), in accordance with an example embodiment. It should be noted at this point that the method of FIG. 6 is an iterative process that may first be performed to establish an initial configuration for RFFE system 100, 200. In subsequent iterations of the method, RFFE system 100, 200 may be reconfigured, depending on analyses performed in blocks 602 and 608.

In embodiments in which amplifier 120 may be a driver amplifier and the system includes a final-stage amplifier 182 and bypass switch 184, the method may begin, in block 602, with the mode controller 170 determining whether or not to configure the system 100, 200 in a "driver stage configuration" or in a "final stage configuration." As discussed previously, in the driver stage configuration, amplifier 120 is operated as a driver stage amplifier, and amplifier 182 is operated as a final stage amplifier. Conversely, in the final stage configuration, amplifier 120 is operated as a final stage amplifier, and amplifier 182 is bypassed with switch 184. For example, the mode controller 170 may decide to configure the system 100, 200 in the final stage configuration when the system is operating in a low-traffic mode, and may decide to configure the system 100, 200 in the driver stage configuration when the system is operating in a high-traffic mode.

When a determination is made in block 602 that the system 100, 200 should be operated in the final stage configuration, then in block 604, the mode controller 170 may send a control signal to the bypass switch 184 to configure the switch in a low-impedance state (i.e., to short the switch 184), thus bypassing amplifier 182. Conversely, when a determination is made that the system 100, 200 should be operated in the driver stage configuration, then in block 606, the mode controller 170 may send a control signal to the bypass switch 184 to configure the switch in a high-impedance state (i.e., to open the switch 184), thus coupling the final-stage amplifier 182 to the output of driver amplifier 120. In embodiments in which amplifier 120 is configured as a final-stage amplifier, and in which optional amplifier 182 and bypass switch 184 are not included in the system, blocks 602, 604, and 606 may be excluded, and the method may begin with block 608.

According to an embodiment, the mode controller 170 may determine in which of three operational modes the amplifier 120 should be configured based on the quality of the radio environment (block 608), and the tuning state of the load (block 610). The selected operational mode also depends on the type of combiner 120 used in the system 100, 200 (e.g., hybrid coupler 300, coupled line structure 400, branch-line coupler 500, FIGS. 3-5), as indicated in blocks 616, 618. The operational modes may include, for example, 1) a balanced power amplifier mode; 2) a parallel Doherty power amplifier mode; and 3) a series Doherty power amplifier mode.

To clearly depict how the mode controller 170 controls the current operational mode of the amplifier 120 as one of the three operational modes, reference is now made to FIG. 7, which is a table 700 that correlates three states of the switchable impedance circuit 150, 150' (e.g., connected to the terminating system impedance, an open circuit impedance, or a short circuit impedance) with the three operational modes (i.e., balanced power amplifier mode, parallel Doherty power amplifier mode, or series Doherty power amplifier mode), in accordance with an example embodiment. In table 700, a first set of columns 701, 702, 703 indicates the settings that will configure the current operational mode of the multiple-mode power amplifier 120 to be the balanced power amplifier mode, a second set of columns 705, 706, 707 indicates the settings that will configure the current operational mode of the multiple-mode power amplifier 120 to be the parallel Doherty power amplifier mode, and a third set of columns 709, 710, 711 indicates the settings that will configure the current operational mode of the multiple-mode power amplifier 120 to be the series Doherty power amplifier mode. Additional columns 704, 708, 712 are included in the table 700 to indicate the radio environment quality (in terms of the load impedance, $R_L$) that warrants establishment in any particular configuration.

Referring again to FIG. 6 and block 608, as part of determining in which of the three operational modes the amplifier 120 should be configured, the mode controller 170 may determine the quality of the radio environment. More specifically, the mode controller 170 may determine whether or not the radio environment is "harsh" based on whether or not the system 100, 200 is experiencing significant reverse interferers as evidenced by large spectral components in the reflected signal. For example, as mentioned previously, a load monitoring circuit 185 may be configured to detect the reflected signal, b, from the load 180 and, in some embodiments, the forward signal, a, from the amplifier 120, and to communicate information to the mode controller 170 (e.g., through input 171) that indicates the reflected and forward signals, b and a, respectively, in amplitude and phase. Based on this information, the mode controller 170 may determine the quality of the radio environment (e.g., as indicated by the reflected signal amplitude and phase) and/or the tuning state of the load 180 (e.g., as indicated by the complex reflection coefficient, Gamma_L). The radio environment may be considered to be "harsh," for example, when the reflected signal amplitude is above a predefined threshold.

When the mode controller 170 determines that the radio environment is harsh, then the mode controller 170 may configure the system 100, 200 as a balanced power amplifier (i.e., amplifier 120 will be configured in the balanced power amplifier mode). In an alternate embodiment, as indicated by the dashed-line connection between blocks 606 and 609, the mode controller 170 may configure the system 100, 200 as a balanced power amplifier whenever the amplifier 120 is being operated as a driver amplifier (e.g., whenever the bypass switch 184 is open, and the lineup includes the final stage amplifier 182).

Either way, to configure the system 100, 200 as a balanced power amplifier, the mode controller 170 may provide control signals to control the state of the amplifier 120 according to columns 701-703 of FIG. 7. More specifically, referring also to rows 714-716, the mode controller 170 may control the switchable impedance circuit 150 to connect the isolated port 132 of the combiner circuitry 130 to the system impedance 161 (e.g., by closing switch 155 and opening switch 156 in switch 150, or by connecting port 132 through switch 151' to system impedance node 153), in block 609. In addition, in block 620, the mode controller 170 may cause the bias controller 140 to provide gate bias voltages over lines 141, 142 to amplifiers 126, 128 that configure both amplifiers 126, 128 to operate in class AB mode. Further, the mode controller 170 may cause the bias controller 140 to provide nominal drain bias voltages over lines 143, 144 to amplifiers 126, 128.

Figure 8:
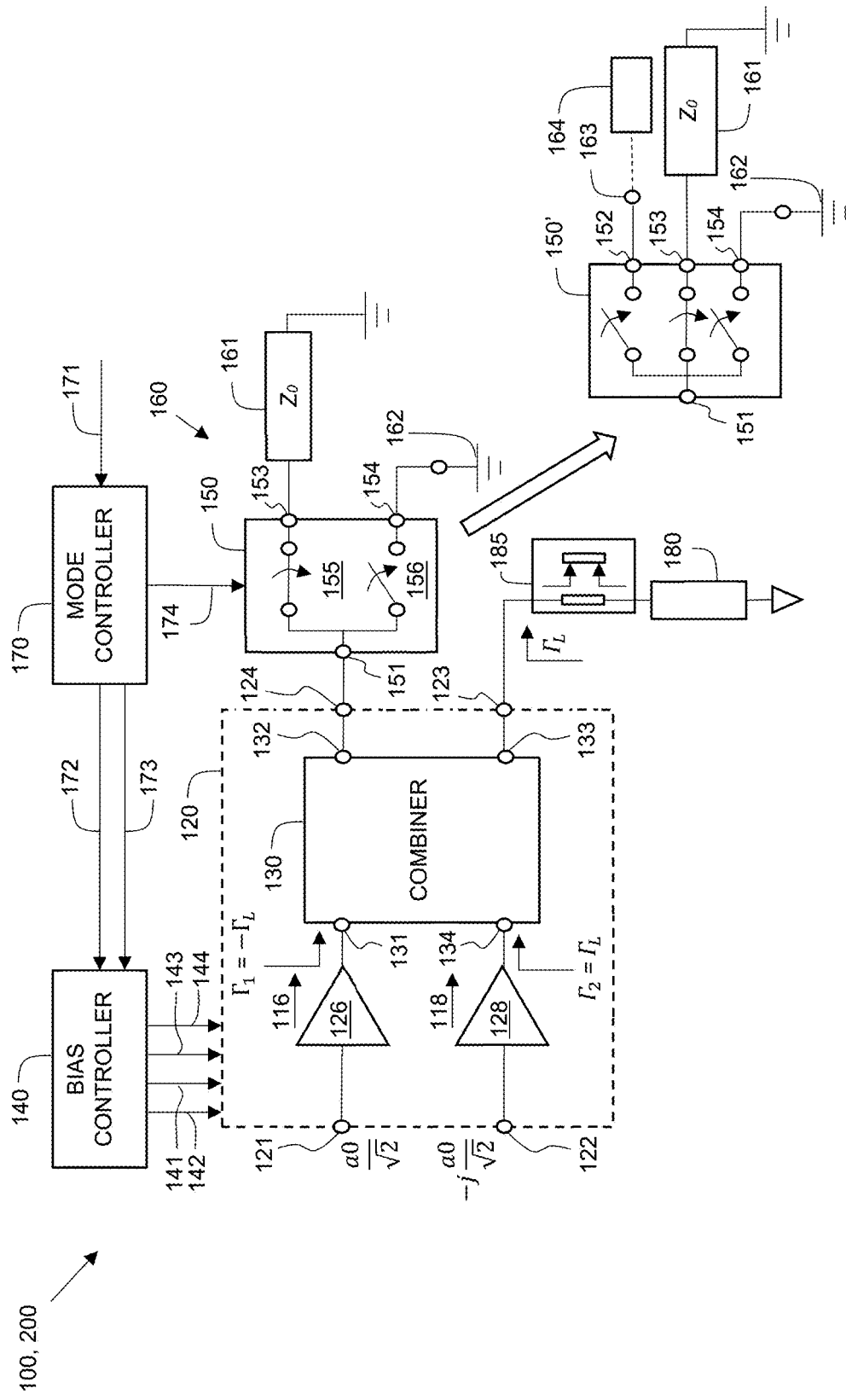
FIG. 8 illustrates a schematic circuit diagram of an embodiment of a multiple-mode power amplifier with a terminating system impedance coupled to an isolated port of a combiner, and when configured as a balanced power amplifier, in accordance with an example embodiment.

FIG. 8 illustrates a schematic circuit diagram of an embodiment of a multiple-mode power amplifier 120 in either RFFE system 100 or 200 when configured as a balanced power amplifier. For simplicity, optional amplifier 182 and bypass switch 184 are not shown in FIG. 8. As indicated above, in the balanced power amplifier mode, both of amplifiers 126, 128 are biased equally in class AB mode, and the combiner circuitry 130 is terminated in the system impedance 161, $Z_0$, at its isolated port 132. This means that the isolated port 132 forces $a_2=0$ in Equation 1, above. The reflection coefficients, $\Gamma_1$ and $\Gamma_2$, respectively, seen by amplifiers 126 and 128 are equal to $\Gamma_L$ and $-\Gamma_L$, respectively. Thus, reflection coefficients $\Gamma_1$ and $\Gamma_2$ are equal in magnitude to any load-mismatch, but with opposite signs. This load balancing effect may help to reduce the overall sensitivity of the balanced amplifier to load-mismatch.

Referring again to FIG. 6 and block 608, when the radio environment is not particularly harsh and when higher back-off efficiency is desired, the mode controller 170 may evaluate the tuning state of the load (e.g., whether Ry, has increased or decreased), in block 610. The tuning state determines whether the isolated port 132 of the combiner circuitry 130 should be coupled to a short circuit impedance or to an open circuit impedance.

Figure 10:
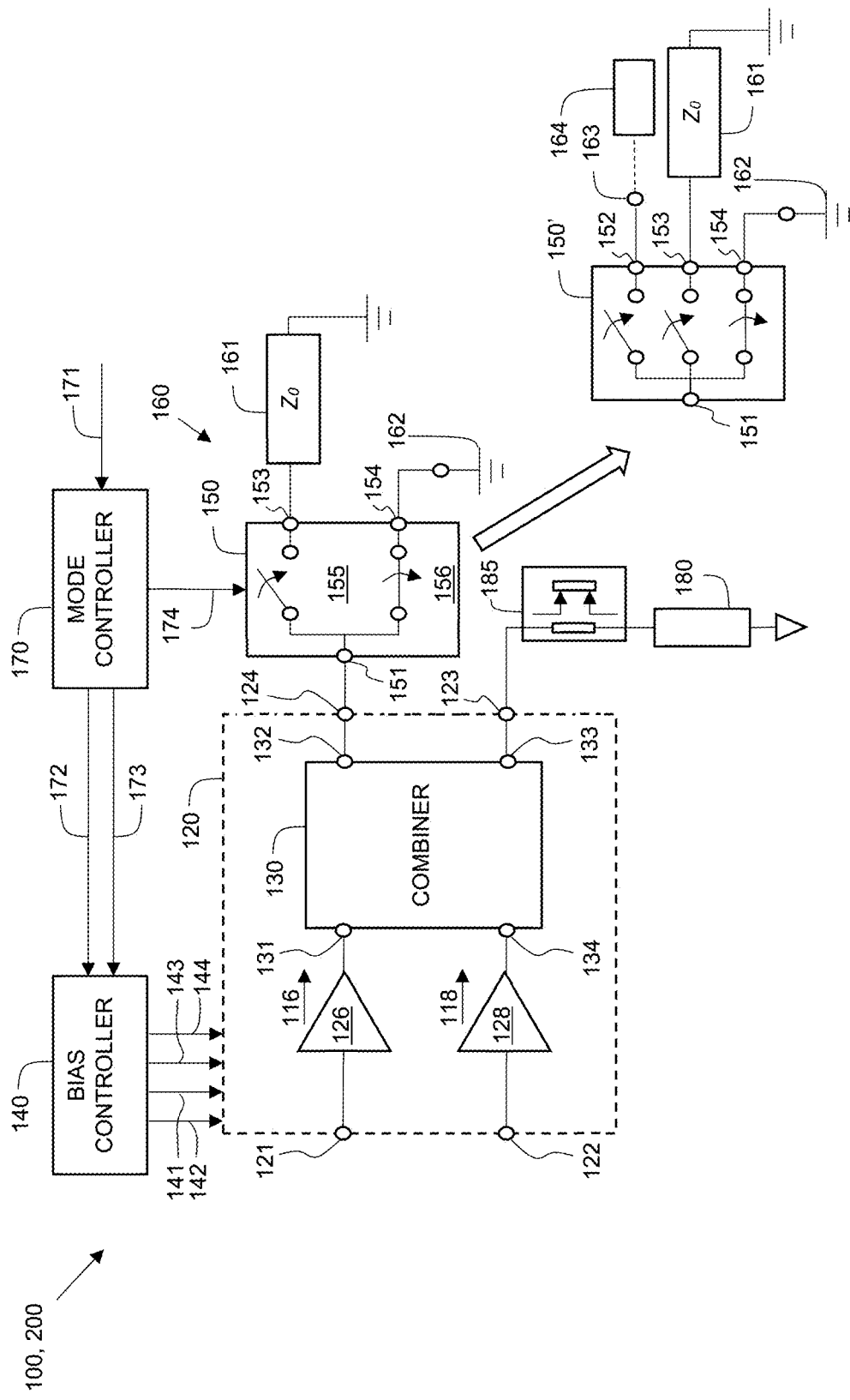
FIG. 10 illustrates a schematic circuit diagram of an embodiment of a multiple-mode power amplifier with a short circuit impedance coupled to an isolated port of a combiner, in accordance with an example embodiment.

When the mode controller 170 determines, in block 610, that the load impedance has increased (INCR") (i.e., the tuning state of the load 180 indicates that it is desirable to enable voltage-based compensation for load-mismatch on the side of the Smith-chart corresponding to impedances higher than the nominal impedance), then the mode controller 170 may control the switchable impedance circuit 150, in block 612, to connect the isolated port 132 of the combiner circuitry 130 to a short circuit impedance 162 (e.g., by opening switch 155 and closing switch 156 in switch 150, or by connecting port 132 through switch 151' to short circuit impedance node 154). FIG. 10 illustrates a schematic circuit diagram of an embodiment of a multiple-mode power amplifier 120 in either RFFE system 100 or 200 with a short circuit impedance coupled to an isolated port 132 of the combiner 130, in accordance with an example embodiment. Again, for simplicity, optional amplifier 182 and bypass switch 184 are not shown in FIG. 10.

At this point, the combiner type factors into whether the system 100, 200 is configured into the parallel or series Doherty power amplifier mode. As indicated in block 616, when the system 100, 200 includes a branch-line coupler (e.g., coupler 500, FIG. 5), then the mode controller 170 may provide control signals to configure the system 100, 200 as a parallel Doherty power amplifier in block 622 (e.g., according to columns 706 and 707 and row 716 of FIG. 7). Conversely, when the system 100, 200 includes either a hybrid coupler 300 or a coupled line structure 400, then the mode controller 170 may provide control signals to configure the system 100, 200 as a series Doherty power amplifier in block 624 (e.g., according to columns 710 and 711 and row 714 or 715 of FIG. 7).

Figure 9:
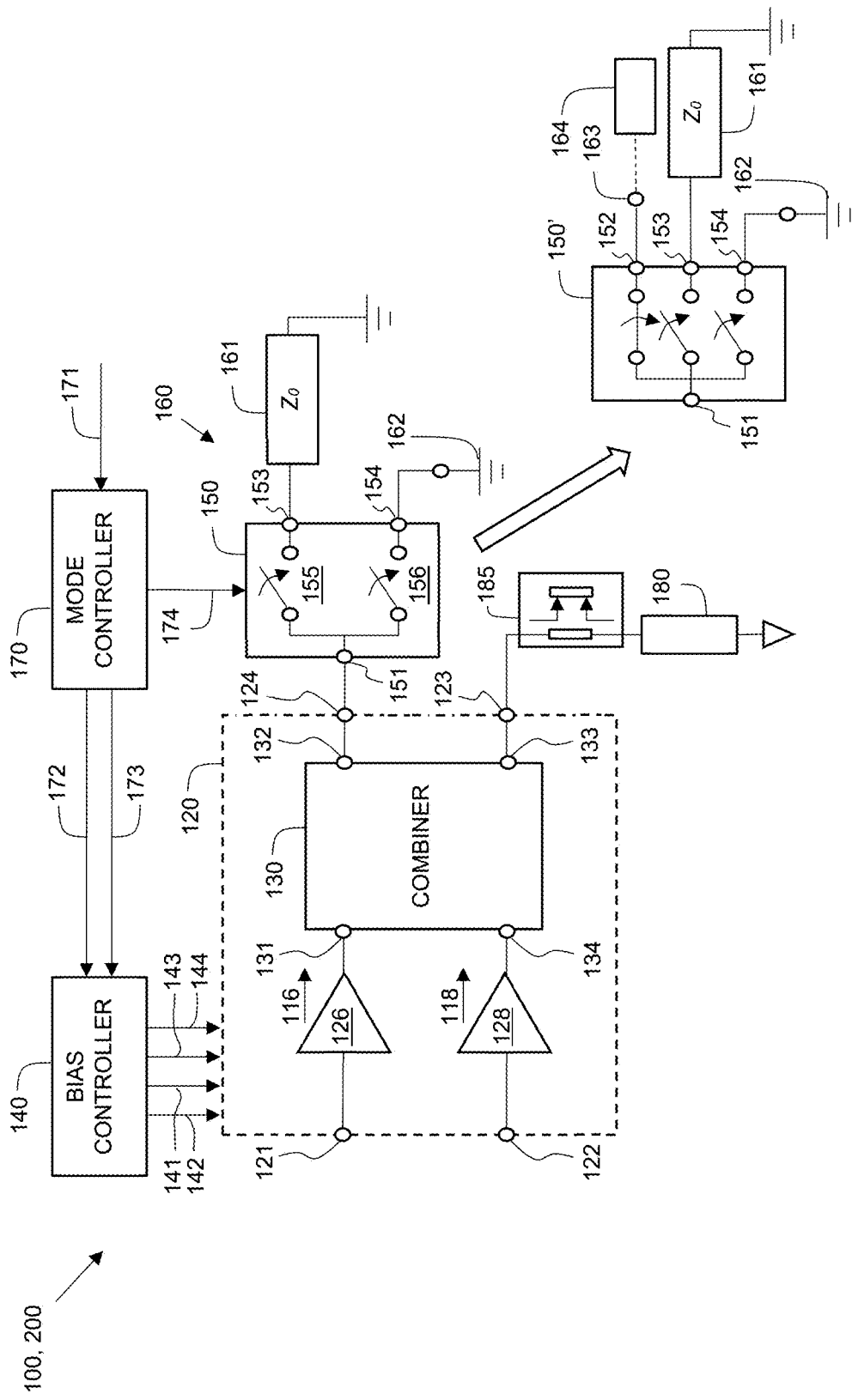
FIG. 9 illustrates a schematic circuit diagram of an embodiment of a multiple-mode power amplifier with an open circuit impedance coupled to an isolated port of a combiner, in accordance with an example embodiment.

Referring again to block 610, when the mode controller 170 determines that the load impedance has decreased ("DECR") (i.e., the tuning state of the load 180 indicates that it is desirable to enable voltage-based compensation for load-mismatch on the side of the Smith-chart corresponding to impedances lower than the nominal impedance), then the mode controller 170 may control the switchable impedance circuit 150, in block 614, to connect the isolated port 132 of the combiner circuitry 130 to an open circuit impedance (e.g., by opening both switches 155, 156 in switch 150, or by connecting port 132 through switch 151' to the high-impedance/open circuit termination 163 or the variable reactive impedance circuit 164). FIG. 9 illustrates a schematic circuit diagram of an embodiment of a multiple-mode power amplifier 120 in either RFFE system 100 or 200 with an open circuit impedance coupled to an isolated port 132 of the combiner 130, in accordance with an example embodiment. Again, for simplicity, optional amplifier 182 and bypass switch 184 are not shown in FIG. 9.

Again, at this point, the combiner type factors into whether the system 100, 200 is configured into the parallel or series Doherty power amplifier mode. As indicated in block 618, when the system 100, 200 includes a branch-line coupler (e.g., coupler 500, FIG. 5), then the mode controller 170 may provide control signals to configure the system 100, 200 as a series Doherty power amplifier in block 624 (e.g., according to columns 710 and 711 and row 716 of FIG. 7). Conversely, when the system 100, 200 includes either a hybrid coupler 300 or a coupled line structure 400, then the mode controller 170 may provide control signals to configure the system 100, 200 as a parallel Doherty power amplifier in block 622 (e.g., according to columns 706 and 707 and row 714 or 715 of FIG. 7).

In any case, to establish the parallel Doherty power amplifier mode in block 622, the mode controller 170 may cause the bias controller 140 to provide gate bias voltages over lines 141, 142 to amplifiers 126, 128 that configure amplifiers 126, 128 to operate in class AB mode and class C mode, respectively (i.e., amplifier 126 is the carrier amplifier, and amplifier 128 is the peaking amplifier).

With respect to the drain bias voltages, $V_{DS}$, in the parallel Doherty power amplifier mode, the mode controller 170 may cause the bias controller 140 to scale up the drain bias voltage provided over line 143 to amplifier 126, as indicated in column 706, and may cause the bias controller 140 to scale down the drain bias voltage provided over line 144 to amplifier 128, as indicated in column 707. According to some embodiments, the drain bias voltage may be scaled up or down linearly based on the magnitude and phase of the change of the load impedance (e.g., the magnitude of the change of $R_L$ or Gamma_L). For example, when the load impedance, $R_L$, has dropped by a factor of 1.2, the mode controller 170 may cause the bias controller 140 to scale up the drain bias voltage for amplifier 126 by a factor of 1.2, and may cause the bias controller 140 to scale down the drain bias voltage for amplifier 128 by a factor of 1.2.

According to other embodiments, the drain bias voltage may be scaled up or down non-linearly based on the magnitude and phase of the change of the load impedance. Such an embodiment may account for the non-linearity of the amplifier current-voltage (IV) characteristics. In some embodiments, the mode controller 170 may be implemented as a digital controller, and the mode controller 170 may access a pre-stored look up table (LUT) in memory that correlates Gamma_L values in magnitude and phase, associated with load impedance changes and desired $V_{DS}$ scaling factors to scaled up and scaled down drain bias voltages for the amplifiers 126, 128.

To establish the series Doherty power amplifier mode in block 624, the mode controller 170 may cause the bias controller 140 to provide gate bias voltages over lines 141, 142 to amplifiers 126, 128 that configure amplifiers 126, 128 to operate in class C mode and class AB mode, respectively (i.e., amplifier 126 is the peaking amplifier, and amplifier 128 is the carrier amplifier).

With respect to the drain bias voltages, $V_{DS}$, in the series Doherty power amplifier mode, the mode controller 170 may cause the bias controller 140 to scale down the drain bias voltage provided over line 143 to amplifier 126, as indicated in column 710, and may cause the bias controller 140 to scale up the drain bias voltage provided over line 144 to amplifier 128, as indicated in column 711. According to some embodiments, as discussed previously, the drain bias voltage may be scaled up or down linearly based on the magnitude and phase of the change of the load impedance. Alternatively, according to other embodiments, which also were discussed previously, the drain bias voltage may be scaled up or down non-linearly based on the magnitude and phase of the change of the load impedance. Again, in some embodiments, the mode controller 170 may be implemented as a digital controller, and the mode controller 170 may access a pre-stored LUT in memory to determine the scaled down and scaled up drain bias voltages for the amplifiers 126, 128, respectively.

Figure 11:
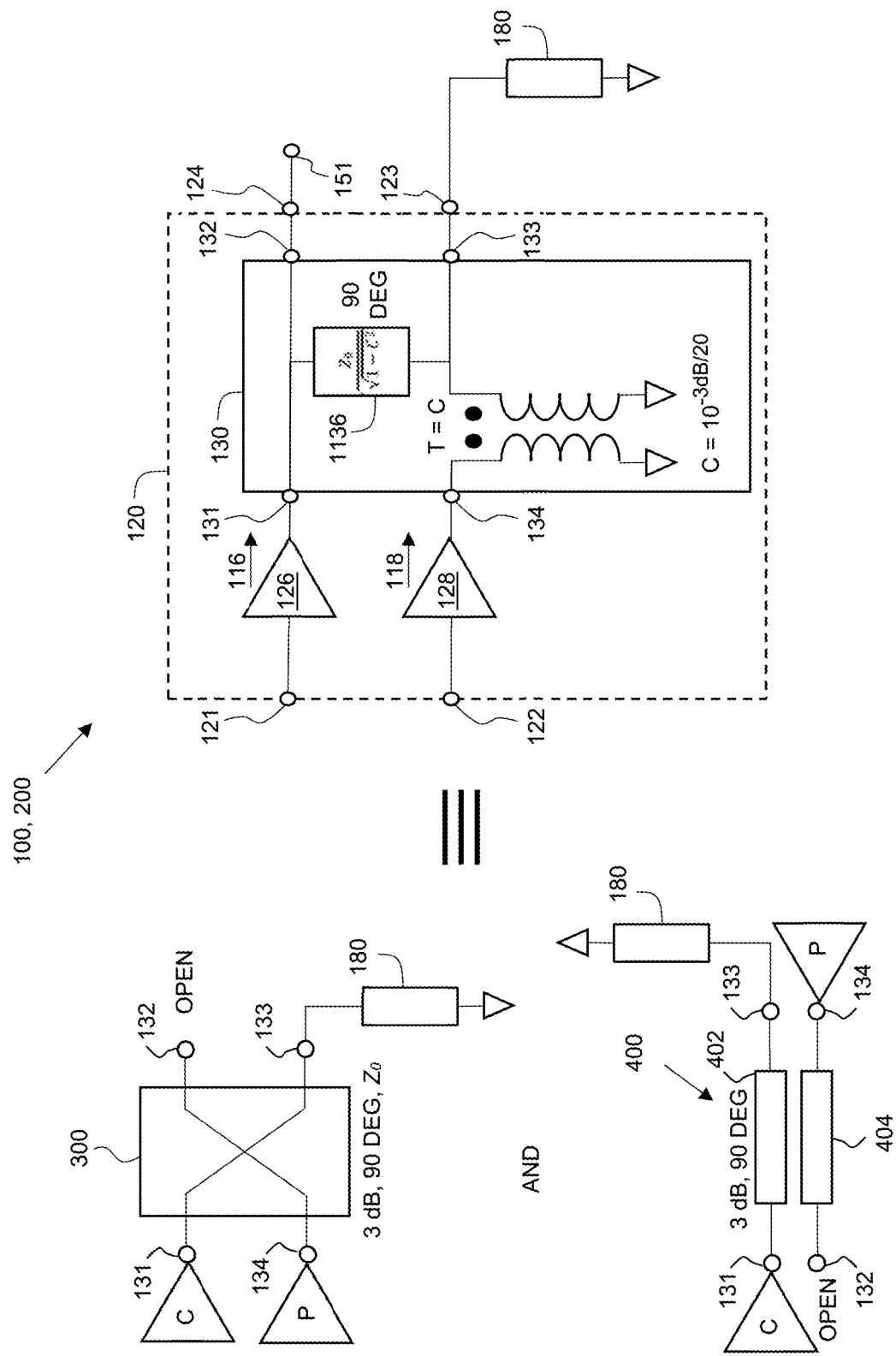
FIG. 11 illustrates equivalent circuits of the multiple-mode power amplifier configured with an open circuit impedance termination as in FIG. 9 and biased to operate as a parallel Doherty power amplifier, in accordance with an example embodiment.
Figure 12:
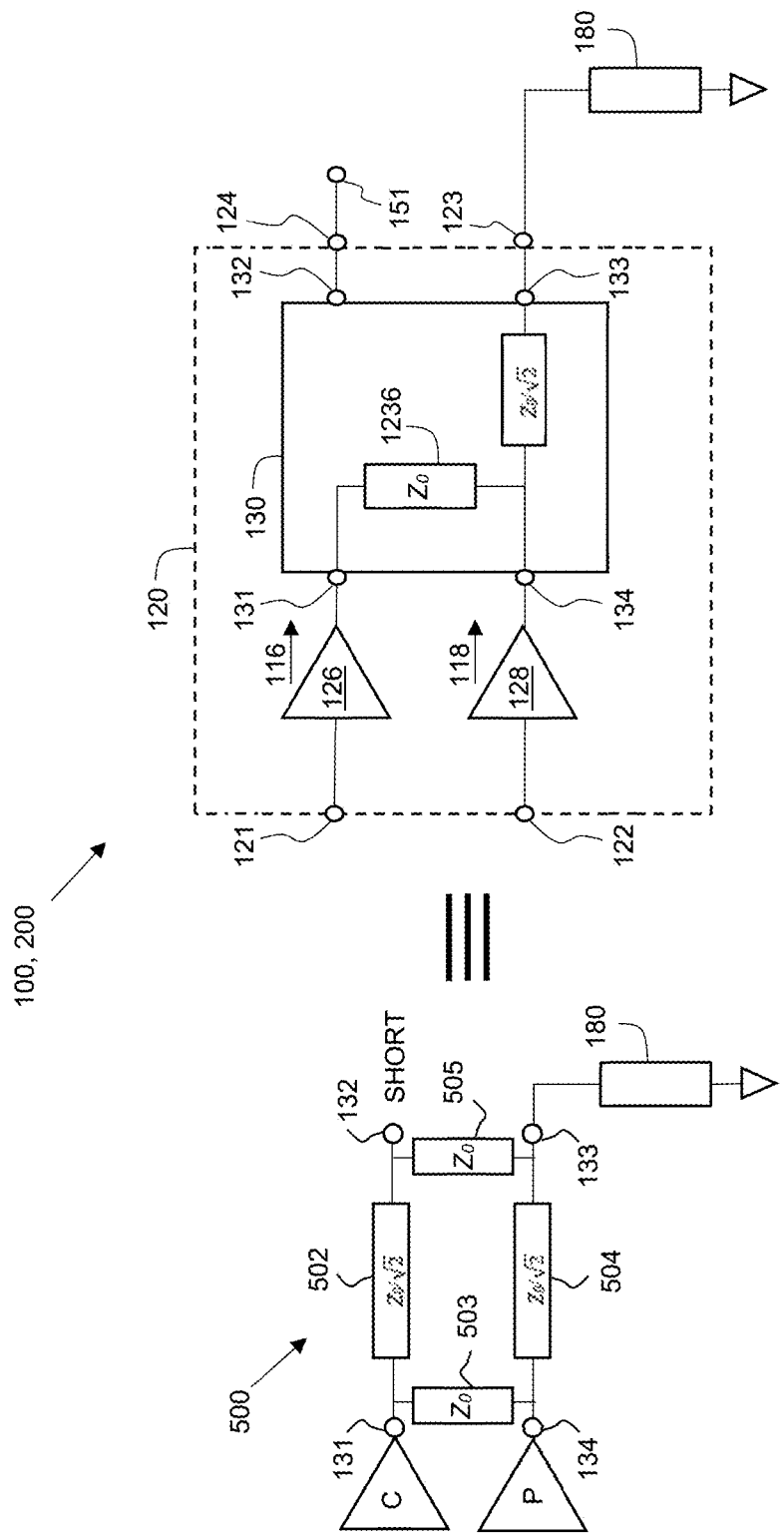
FIG. 12 illustrates equivalent circuits of the multiple-mode power amplifier configured with a short circuit impedance termination as in FIG. 10 and biased to operate as a parallel Doherty power amplifier, in accordance with an example embodiment.

For enhanced understanding, equivalent circuits of the above-described parallel and series Doherty power amplifier modes will now be described. In particular, FIGS. 11 and 12 illustrate equivalent circuits of the multiple-mode power amplifier when configured as a parallel Doherty power amplifier. More specifically, FIG. 11 pertains to an amplifier in which the combiner 130 is implemented as a hybrid coupler (e.g., coupler 300, FIG. 3) or a coupled line structure (e.g., structure 400, FIG. 4), and the isolated port 132 of the combiner circuitry 130 is coupled to an open circuit impedance (e.g., as in the configuration of FIG. 9). Conversely, FIG. 12 pertains to an amplifier in which the combiner 130 is implemented as a branch line coupler (e.g., coupler 500, FIG. 5), and the isolated port 132 of the combiner circuitry 130 is coupled to a short circuit impedance (e.g., as in the configuration of FIG. 10).

Referring first to FIG. 11, for an amplifier that includes a hybrid coupler (e.g., coupler 300, FIG. 3) or a coupled line structure (e.g., structure 400, FIG. 4), an equivalent circuit is provided for the multiple-mode power amplifier when configured as a parallel Doherty power amplifier as in FIG. 7 columns 705-707 and rows 714, 715. As indicated in columns 706 and 707, in the parallel Doherty power amplifier mode, amplifier 126 is biased in class AB mode, amplifier 128 is biased in class C mode (i.e., amplifier 126 is the carrier amplifier, designated with a "C", and amplifier 128 is the peaking amplifier, designated with a "P"). As indicated in column 705 and rows 714 and 715, the combiner circuitry 130 is terminated in an open circuit impedance at its isolated port 132. As shown in FIG. 9, this may be achieved by opening switches 155 and 156 for multiple-way switch 150 or by closing the switch coupled to the open circuit impedance termination 163 for switch 150'. By terminating the isolated port 132 of the combiner circuitry 130 in an open circuit impedance, the equivalency of the circuits depicted in FIG. 11 may be verified. Further, by biasing amplifier 126 in class AB mode and biasing amplifier 128 in class C mode, a parallel Doherty configuration is established, where a resulting 90 degree inverter 1136 (FIG. 11) in the first amplification path 116, having an impedance of $$\frac{Z_0}{\sqrt{1-C^2}},$$

will allow load-modulation by the peaking amplifier over a VSWR=2, from $R_{mod}$ to $R_{mod}/2$. This may result in elevated back-off efficiency at 6 dB of output back off (OBO), as is expected from a symmetric Doherty power amplifier.

Referring next to FIG. 12, for an amplifier that includes a branch line coupler (e.g., coupler 500, FIG. 5), an equivalent circuit is provided for the multiple-mode power amplifier when configured as a parallel Doherty power amplifier as in FIG. 7 columns 705-707 and row 716. As indicated in columns 706 and 707, in the parallel Doherty power amplifier mode, amplifier 126 is biased in class AB mode, amplifier 128 is biased in class C mode (i.e., amplifier 126 is the carrier amplifier, and amplifier 128 is the peaking amplifier). As indicated in column 705 and row 716, the combiner circuitry 130 is terminated in a short circuit impedance at its isolated port 132. As shown in FIG. 10, this may be achieved by opening switch 155 and closing switch 156 for multiple-way switch 150 or by closing the switch coupled to the short circuit impedance termination 162 for switch 150'. By terminating the isolated port 132 of the combiner circuitry 130 in short circuit impedance, the equivalency of the circuits depicted in FIG. 12 may be verified. Further, by biasing amplifier 126 in class AB mode and biasing amplifier 128 in class C mode, a parallel Doherty configuration is established, where a resulting 90 degree inverter 1236 (FIG. 12) in the first amplification path 116, having an impedance of $Z_0$, will allow load-modulation by the peaking amplifier over a VSWR=2, from $R_{mod}$ to $R_{mod}/2$.

Figure 13:
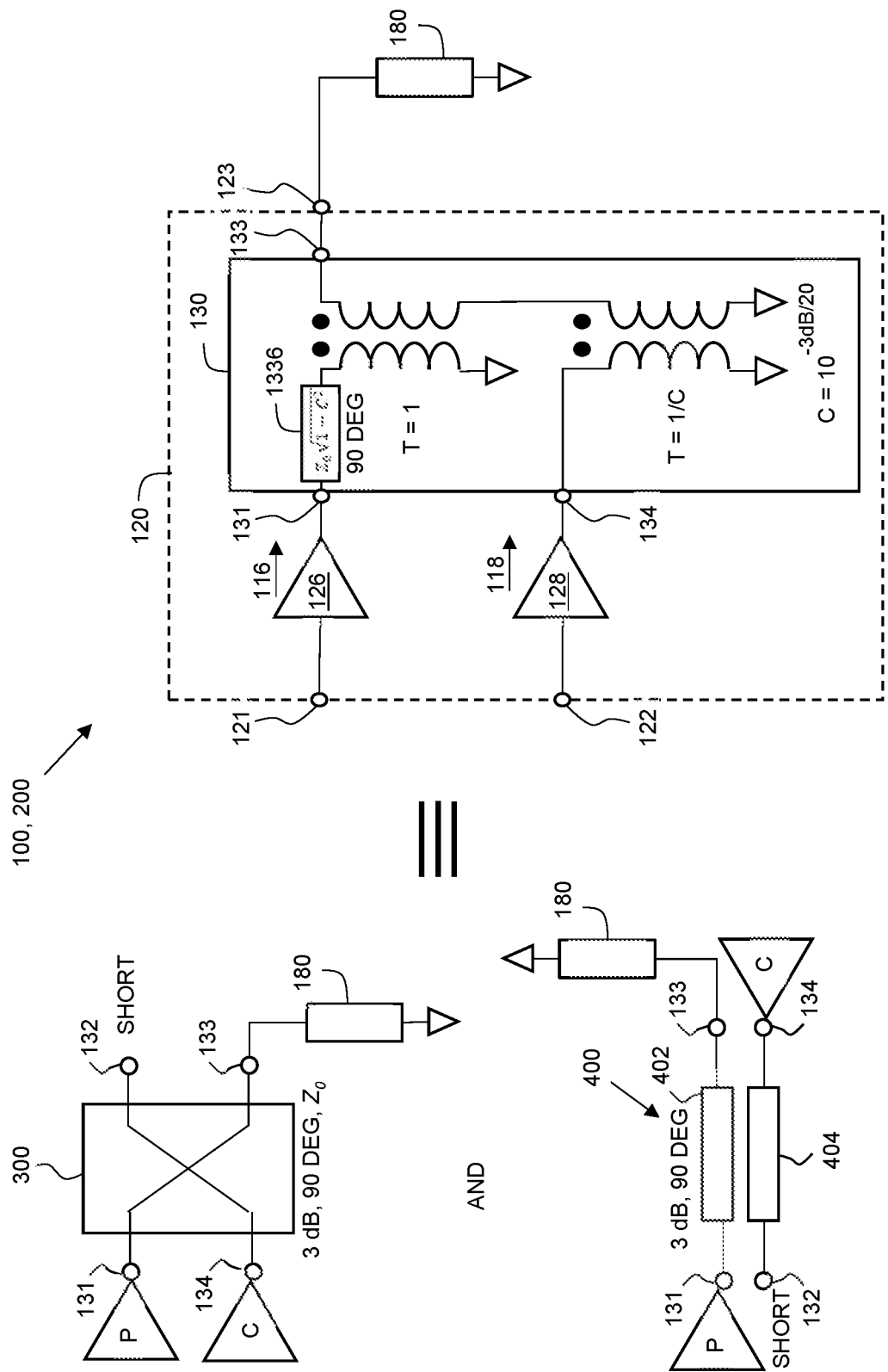
FIG. 13 illustrates an equivalent circuit of the multiple-mode power amplifier configured with a short circuit impedance termination as in FIG. 10 and biased to operate as a series Doherty power amplifier, in accordance with an example embodiment.
Figure 14:
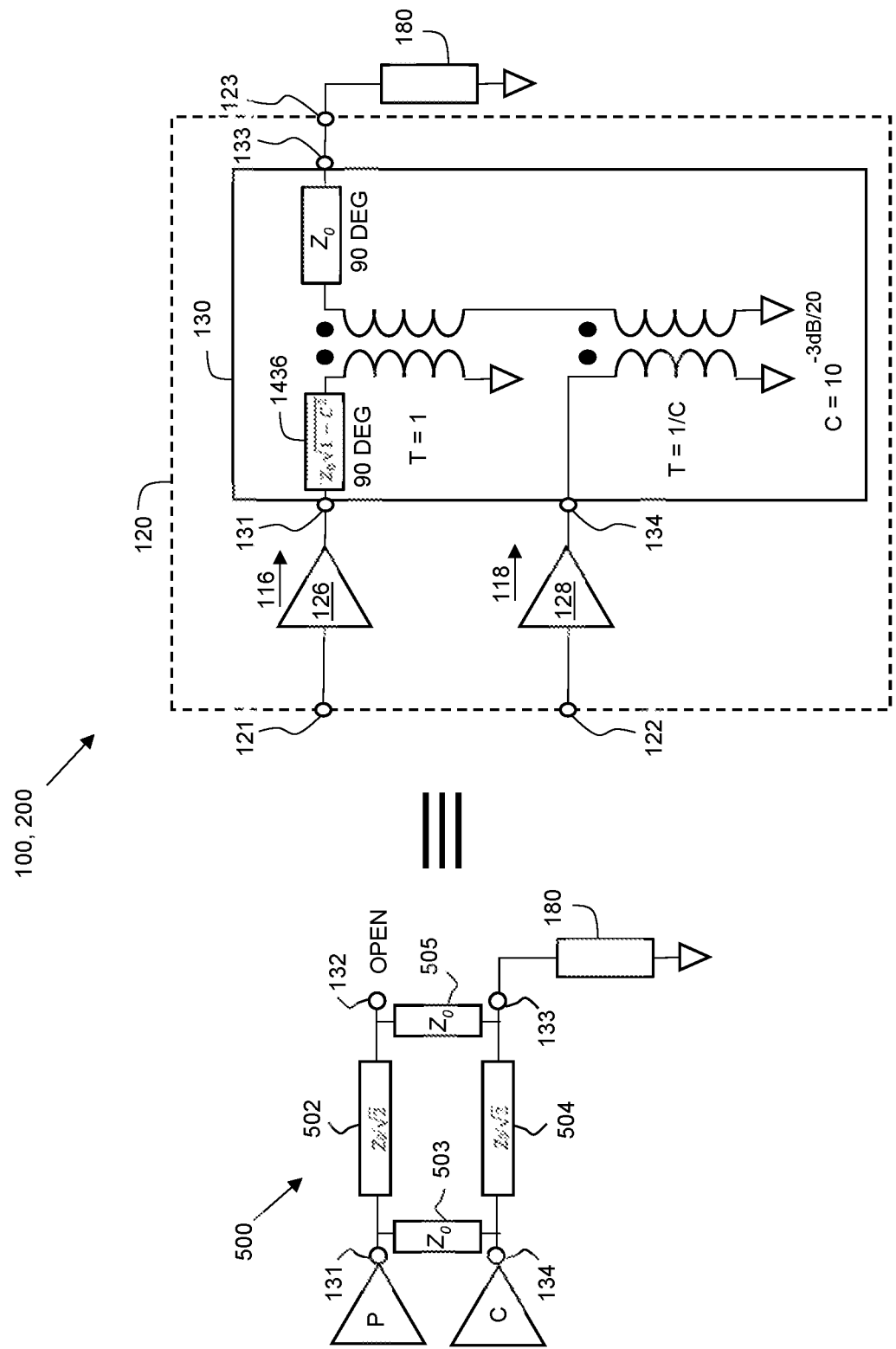
FIG. 14 illustrates an equivalent circuit of the multiple-mode power amplifier configured with an open circuit impedance termination as in FIG. 9 and biased to operate as a series Doherty power amplifier, in accordance with an example embodiment.

FIGS. 13 and 14 illustrate equivalent circuits of the multiple-mode power amplifier when configured as a series Doherty power amplifier. More specifically, FIG. 13 pertains to an amplifier in which the combiner 130 is implemented as a hybrid coupler (e.g., coupler 300, FIG. 3) or a coupled line structure (e.g., structure 400, FIG. 4), and the isolated port 132 of the combiner circuitry 130 is coupled to a short circuit impedance (e.g., as in the configuration of FIG. 10). Conversely, FIG. 14 pertains to an amplifier in which the combiner 130 is implemented as a branch line coupler (e.g., coupler 500, FIG. 5), and the isolated port 132 of the combiner circuitry 130 is coupled to an open circuit impedance (e.g., as in the configuration of FIG. 9).

Referring first to FIG. 13, for an amplifier that includes a hybrid coupler (e.g., coupler 300, FIG. 3) or a coupled line structure (e.g., structure 400, FIG. 4), an equivalent circuit is provided for the multiple-mode power amplifier when configured as a series Doherty power amplifier as in FIG. 7 columns 709-711 and rows 714, 715. As indicated in columns 710 and 711, in the series Doherty power amplifier mode, amplifier 126 is biased in class C mode, amplifier 128 is biased in class AB mode (i.e., amplifier 126 is the peaking amplifier, designated with a "P", and amplifier 128 is the carrier amplifier, designated with a "C"). As indicated in column 709 and rows 714 and 715, the combiner circuitry 130 is terminated in a short circuit impedance at its isolated port 132. As shown in FIG. 10, this may be achieved by opening switch 155 and closing switch 156 for multiple-way switch 150 or by closing the switch coupled to short circuit impedance termination 162 for switch 150'. By terminating the isolated port 132 of the combiner circuitry 130 in a short circuit impedance, the equivalency of the circuits depicted in FIG. 13 may be verified. Further, by biasing amplifier 126 in class C mode and biasing amplifier 128 in class AB mode, a series Doherty power amplifier configuration is established. Instead of combining current in a combiner network node (e.g., as is the case with a parallel Doherty power amplifier configuration), voltages from the respective amplifiers 126, 128 are staggered, and their sum appears over the load-impedance. The resulting 90 degree inverter 1336 in the peaking path 118, having an impedance of $Z_0\sqrt{1-C^2}$, ensures that a short is provided at back-off, while the extra current that flows through the output-loop as a result of the added voltage originating from the peaking amplifier in higher drive-up makes the impedance seen by the carrier amplifier 128 modulate over a VSWR=2 from $R_{mod}$ to $R_{mod}/2$. Again, this may result in elevated back-off efficiency at 6 dB of OBO, as expected from a symmetric Doherty power amplifier.

Referring next to FIG. 14, for an amplifier that includes a branch line coupler (e.g., coupler 500, FIG. 5), an equivalent circuit is provided for the multiple-mode power amplifier when configured as a series Doherty power amplifier as in FIG. 7 columns 709-711 and row 716. As indicated in columns 710 and 711, in the series Doherty power amplifier mode, amplifier 126 is biased in class C mode, amplifier 128 is biased in class AB mode (i.e., amplifier 126 is the peaking amplifier, and amplifier 128 is the carrier amplifier). As indicated in column 709 and row 716, the combiner circuitry 130 is terminated in an open circuit impedance at its isolated port 132. As shown in FIG. 9, this may be achieved by opening switches 155 and 156 for multiple-way switch 150 or by closing the switch coupled to the open circuit impedance termination 163 for switch 150'. By terminating the isolated port 132 of the combiner circuitry 130 in an open circuit impedance, the equivalency of the circuits depicted in FIG. 14 may be verified. Further, by biasing amplifier 126 in class C mode and biasing amplifier 128 in class AB mode, a series Doherty power amplifier configuration is established. Again, the resulting 90 degree inverter 1436 in the peaking path 118, having an impedance of $Z_0\sqrt{1-C^2}$, ensures that a short is provided at back-off, while the extra current that is driven through the output-loop in higher drive-up makes the impedance seen by the carrier amplifier 128 modulate over a VSWR=2 from $R_{mod}$ to $R_{mod}/2$.

Referring again to FIG. 6, and as mentioned earlier, after configuring the amplifier 120 in an initial mode by performing the steps of one of blocks 620, 622, or 624, the process depicted in FIG. 6 may iterate to re-configure the amplifier 120 multiple times during operation based on the dynamic quality of the radio environment, the desired back off efficiency, and/or the current traffic mode.

An embodiment of a multiple-mode RF power amplifier includes first and second amplifier system inputs, an amplifier system output, a first amplifier coupled to the first amplifier system input, and a second amplifier coupled to the second amplifier system input. The first amplifier is configured to receive a first input RF signal from the first amplifier system input and to produce a first amplified RF signal at an output of the first amplifier. The second amplifier is configured to receive a second input RF signal from the second amplifier system input and to produce a second amplified RF signal at an output of the second amplifier. The multiple-mode RF power amplifier further includes combiner circuitry having first, second, third, and fourth combiner ports, where the first combiner port is coupled to the output of the first amplifier, the second combiner port is coupled to the output of the second amplifier, the third combiner port is coupled to the amplifier system output, and the combiner circuitry is configured to combine the first and second amplified RF signals to produce a combined amplified RF signal at the third combiner port. The multiple-mode RF power amplifier further includes a switchable impedance circuit with an input terminal coupled to the fourth combiner port. When the switchable impedance circuit is in a first state, the fourth combiner port is coupled through the switchable impedance circuit to a terminating system impedance to configure the multiple-mode RF power amplifier as a balanced amplifier. When the switchable impedance circuit is in a second state, the fourth combiner port is coupled through the switchable impedance circuit to an open circuit impedance to configure the multiple-mode RF power amplifier as a first type of Doherty power amplifier (e.g., a parallel or a series Doherty power amplifier). When the switchable impedance circuit is in a third state, the fourth combiner port is coupled through the switchable impedance circuit to a short circuit impedance (e.g., a ground reference node) to configure the multiple-mode RF power amplifier as a second type of Doherty power amplifier (e.g., a series or a parallel Doherty power amplifier).

An embodiment of a radio frequency front end (RFFE) system includes a mode controller, and a multiple-mode RF power amplifier coupled to the mode controller. The multiple-mode RF power amplifier includes first and second RF power amplifier inputs, an RF power amplifier output, a first power amplifier coupled to the first RF power amplifier input, and a second power amplifier coupled to the second RF power amplifier input. The first amplifier is configured to receive a first input RF signal from the first RF power amplifier input and to produce a first amplified RF signal at an output of the first power amplifier. The second power amplifier is configured to receive a second input RF signal from the second RF power amplifier input and to produce a second amplified RF signal at an output of the second power amplifier. The multiple-mode RF power amplifier further includes output combiner circuitry having first, second, third, and fourth combiner ports. The first combiner port is coupled to the output of the first power amplifier, the second combiner port is coupled to the output of the second power amplifier, the third combiner port is coupled to the RF power amplifier output, and the output combiner circuitry is configured to combine the first and second amplified RF signals to produce a combined amplified RF signal at the third combiner port. The multiple-mode RF power amplifier further includes a switchable impedance circuit comprising a switch with an input terminal coupled to the fourth combiner port, where a current state of the switch is controlled by a control signal from the mode controller. When the control signal causes the switch to be configured in a first state, the fourth combiner port is coupled through the switch to a terminating system impedance to configure the multiple-mode RF power amplifier as a balanced amplifier. When the control signal causes the switch to be configured in a second state, the fourth combiner port is coupled through the switch to an open circuit impedance to configure the multiple-mode RF power amplifier as a first type of Doherty power amplifier (e.g., a parallel or a series Doherty power amplifier). Finally, when the control signal causes the switch to be configured in a third state, the fourth combiner port is coupled through the switch to a short circuit impedance (e.g., a ground reference node) to configure the multiple-mode RF power amplifier as a second type of Doherty power amplifier (e.g., a series or a parallel Doherty power amplifier).

In additional embodiments, the RFFE system also includes a bias controller, which is configured to provide gate bias voltages to the first and second amplifiers to configure the multiple-mode RF power amplifier as the balanced amplifier, the first type of Doherty power amplifier, or the second type of Doherty power amplifier. According to additional embodiments, the bias controller is further configured to provide a first drain bias voltage to the first amplifier, and to provide a second drain bias voltage to the second amplifier, where, when the multiple-mode RF power amplifier is configured as a balanced amplifier, the bias controller provides a nominal drain bias voltage to the first and second amplifiers, and when the multiple-mode RF power amplifier is configured as either the first or second type of Doherty power amplifier, the bias controller provides a scaled up drain bias voltage to whichever of the first or second amplifier is configured to operate in the class AB operational mode, and the bias controller provides a scaled down drain bias voltage to whichever of the first or second amplifier is configured to operate in the class C operational mode.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multiple-mode radio frequency (RF) power amplifier comprising:
    first and second amplifier system inputs;
    an amplifier system output;
    a first amplifier coupled to the first amplifier system input, wherein the first amplifier is configured to receive a first input RF signal from the first amplifier system input and to produce a first amplified RF signal at an output of the first amplifier;
    a second amplifier coupled to the second amplifier system input, wherein the second amplifier is configured to receive a second input RF signal from the second amplifier system input and to produce a second amplified RF signal at an output of the second amplifier;
    combiner circuitry having first, second, third, and fourth combiner ports, wherein the first combiner port is coupled to the output of the first amplifier, the second combiner port is coupled to the output of the second amplifier, the third combiner port is coupled to the amplifier system output, and the combiner circuitry is configured to combine the first and second amplified RF signals to produce a combined amplified RF signal at the third combiner port;
    a switchable impedance circuit with an input terminal coupled to the fourth combiner port, wherein
        when the switchable impedance circuit is in a first state, the fourth combiner port is coupled through the switchable impedance circuit to a terminating system impedance to configure the multiple-mode RF power amplifier as a balanced amplifier,
        when the switchable impedance circuit is in a second state, the fourth combiner port is coupled through the switchable impedance circuit to an open circuit impedance to configure the multiple-mode RF power amplifier as a first type of Doherty power amplifier, and
        when the switchable impedance circuit is in a third state, the fourth combiner port is coupled through the switchable impedance circuit to a short circuit impedance to configure the multiple-mode RF power amplifier as a second type of Doherty power amplifier; and
    a bias controller configured to provide a first gate bias voltage to the first amplifier, and to provide a second gate bias voltage to the second amplifier, wherein,
        when the switchable impedance circuit is in the first state, the bias controller provides the first and second gate bias voltages to configure the first amplifier to operate in a class AB operational mode, and to configure the second amplifier in the class AB operational mode,
        when the switchable impedance circuit is in the second state, the bias controller provides the first and second gate bias voltages to configure the first amplifier to operate in the class AB operational mode, and to configure the second amplifier in a class C operational mode,
    when the switchable impedance circuit is in the third state, the bias controller provides the first and second gate bias voltages to configure the first amplifier to operate in the class C operational mode, and to configure the second amplifier in the class AB operational mode, and
    wherein the bias controller is further configured to provide a first drain bias voltage to the first amplifier, and to provide a second drain bias voltage to the second amplifier, wherein,
        when the multiple-mode RF power amplifier is configured as a balanced amplifier, the bias controller provides a nominal drain bias voltage to the first and second amplifiers,
        when the multiple-mode RF power amplifier is configured as either the first or second type of Doherty power amplifier, the bias controller provides a scaled up drain bias voltage to whichever of the first or second amplifier is configured to operate in the class AB operational mode, and the bias controller provides a scaled down drain bias voltage to whichever of the first or second amplifier is configured to operate in the class C operational mode.

2. The multiple-mode RF power amplifier of claim 1, wherein:

the terminating system impedance is a 50 Ohm impedance;
the output of the first power amplifier is matched to the terminating system impedance; and
the output of the second power amplifier is matched to the terminating system impedance.

3. The multiple-mode RF power amplifier of claim 1, wherein the fourth combiner port is an isolated port.

4. The multiple-mode RF power amplifier of claim 1, wherein:
the output combiner circuitry comprises a four-port device selected from a 3 dB 90 degree hybrid coupler and a 3 dB 90 degree coupled line structure;
the first type of Doherty power amplifier is a parallel Doherty power amplifier; and
the second type of Doherty power amplifier is a series Doherty power amplifier.

5. The multiple-mode RF power amplifier of claim 1, wherein:
the output combiner circuitry comprises a branch line coupler;
the first type of Doherty power amplifier is a series Doherty power amplifier; and
the second type of Doherty power amplifier is a parallel Doherty power amplifier.

6. The multiple-mode RF power amplifier of claim 1, wherein the switchable impedance circuit has a first output coupled to the terminating system impedance, a second output coupled to an open circuit impedance, and a third output coupled to a short circuit impedance.

7. The multiple-mode RF power amplifier of claim 1, wherein the switchable impedance circuit has a first output coupled to the terminating system impedance, and a second output coupled to a short circuit impedance.

8. The multiple-mode RF power amplifier of claim 1, further comprising:
a power splitter having a splitter input and first and second splitter outputs, wherein the splitter input is coupled to an RF signal source, the first splitter output is coupled to an input of the first power amplifier, and the second splitter output is coupled to an input of the second power amplifier, and wherein the power splitter is configured to receive a pre-split input RF signal from the RF signal source, and to divide the pre-split input RF signal into the first input RF signal and the second input RF signal.

9. The multiple-mode RF power amplifier of claim 8, wherein the power splitter is configured to apply a 90 degree phase difference between the first and second input RF signals.

10. The multiple-mode RF power amplifier of claim 1, further comprising:
a first RF signal source coupled to an input of the first power amplifier, wherein the first RF signal source is configured to provide the first input RF signal; and
a second RF signal source coupled to an input of the second power amplifier, wherein the second RF signal source is configured to provide the second input RF signal.

11. A radio frequency front end (RFFE) system comprising:
a mode controller; and
a multiple-mode radio frequency (RF) power amplifier coupled to the mode controller, wherein the multiple-mode RF power amplifier includes
first and second RF power amplifier inputs,
an RF power amplifier output,
a first amplifier coupled to the first RF power amplifier input, wherein the first amplifier is configured to receive a first input RF signal from the first RF power amplifier input and to produce a first amplified RF signal at an output of the first amplifier,
a second amplifier coupled to the second RF power amplifier input, wherein the second amplifier is configured to receive a second input RF signal from the second RF power amplifier input and to produce a second amplified RF signal at an output of the second amplifier,
output combiner circuitry having first, second, third, and fourth combiner ports, wherein the first combiner port is coupled to the output of the first amplifier, the second combiner port is coupled to the output of the second amplifier, the third combiner port is coupled to the RF power amplifier output, and the output combiner circuitry is configured to combine the first and second amplified RF signals to produce a combined amplified RF signal at the third combiner port,
a switchable impedance circuit comprising a switch with an input terminal coupled to the fourth combiner port, wherein a current state of the switch is controlled by a control signal from the mode controller, and
when the control signal causes the switch to be configured in a first state, the fourth combiner port is coupled through the switch to a terminating system impedance to configure the multiple-mode RF power amplifier as a balanced amplifier,
when the control signal causes the switch to be configured in a second state, the fourth combiner port is coupled through the switch to an open circuit impedance to configure the multiple-mode RF power amplifier as a first type of Doherty power amplifier, and
when the control signal causes the switch to be configured in a third state, the fourth combiner port is coupled through the switch to a short circuit impedance to configure the multiple-mode RF power amplifier as a second type of Doherty power amplifier, and
a bias controller, wherein the bias controller is configured to provide gate bias voltages to the first and second amplifiers to configure the multiple-mode RF power amplifier as the balanced amplifier, the first type of Doherty power amplifier, or the second type of Doherty power amplifier, and wherein the bias controller is further configured to provide a first drain bias voltage to the first amplifier, and to provide a second drain bias voltage to the second amplifier, wherein,
when the multiple-mode RF power amplifier is configured as a balanced amplifier, the bias controller provides a nominal drain bias voltage to the first and second amplifiers, and
when the multiple-mode RF power amplifier is configured as either the first or second type of Doherty power amplifier, the bias controller provides a scaled up drain bias voltage to whichever of the first or second amplifier is configured to operate in the class AB operational mode, and the bias controller provides a scaled down drain bias voltage to whichever of the first or second amplifier is configured to operate in the class C operational mode.

12. The RFFE system of claim 11, wherein:
the output combiner circuitry comprises a four-port device selected from a 3 dB 90 degree hybrid coupler and a 3 dB 90 degree coupled line structure;
the first type of Doherty power amplifier is a parallel Doherty power amplifier; and
the second type of Doherty power amplifier is a series Doherty power amplifier.

13. The RFFE system of claim 11, wherein:
the output combiner circuitry comprises a branch line coupler;
the first type of Doherty power amplifier is a series Doherty power amplifier; and
the second type of Doherty power amplifier is a parallel Doherty power amplifier.

14. The RFFE system of claim 11, wherein the mode controller is configured to produce the control signal based on information selected from information that characterizes a quality of a radio environment, a traffic mode, a magnitude of reflected signal power, and a type of voltage-scaling.

15. The RFFE system of claim 11, further comprising:
a load monitoring circuit coupled between the third combiner port and a load, wherein the load monitoring circuit is configured to detect a magnitude of a reflected signal power from the load, and to communicate information indicating the reflected signal power to the mode controller, and
wherein the mode controller is configured to produce the control signal based on the information indicating the reflected signal power.

* * * * *